US012640630B2

(12) United States Patent　　(10) Patent No.:　US 12,640,630 B2

Ranalli et al.　　　　　　　　　(45) Date of Patent:　　May 26, 2026

(54) METHOD AND APPARATUS FOR ASSEMBLING A WINDING OF HAIRPINS

(71) Applicant: TECNOMATIC S.P.A., Corropoli (IT)

(72) Inventors: Giuseppe Ranalli, Corropoli (IT);
Sergio Tancredi, Corropoli (IT);
Francesco Lucchetti, Corropoli (IT);
Maurilio Micucci, Corropoli (IT)

(73) Assignee: TECNOMATIC S.P.A. (IT)

( * ) Notice: Subject to any disclaimer, the term of this patent is extended or adjusted under 35 U.S.C. 154(b) by 623 days.

(21) Appl. No.: 18/003,510

(22) PCT Filed: Jun. 24, 2022

(86) PCT No.: PCT/IB2022/055872

§ 371 (c)(1),
(2) Date: Dec. 28, 2022

(87) PCT Pub. No.: WO2023/281340

PCT Pub. Date: Jan. 12, 2023

(65) Prior Publication Data

US 2024/0106309 A1　　Mar. 28, 2024

(30) Foreign Application Priority Data

Jul. 5, 2021　(IT) ........................ 102021000017636

(51) Int. Cl.
*H02K 15/0428*　　(2025.01)

(52) U.S. Cl.
CPC ................................ *H02K 15/0428* (2013.01)

(58) Field of Classification Search
CPC ............. H02K 15/0428; H02K 15/064; H02K 15/0421; H02K 15/085
See application file for complete search history.

(56) References Cited

U.S. PATENT DOCUMENTS 5,522,125 A　*　6/1996　Bradtmueller ......... H02K 13/04
29/736
7,941,910 B2 *　5/2011　Guercioni ............ H02K 15/064
29/598

(Continued)

FOREIGN PATENT DOCUMENTS

WO　　　2012007973 A1　　1/2012

OTHER PUBLICATIONS

International Search Report, issued in PCT/IB2022/055872, mailed Sep. 26, 2022, Rijswijk, NL.

*Primary Examiner* — Thomas J Hong
*Assistant Examiner* — Jose K Abraham
(74) *Attorney, Agent, or Firm* — Valauskas Corder LLC

(57)　　　　　ABSTRACT

An apparatus for assembling a winding of hairpins is provided. The apparatus has a feeding section, an insertion section into a winding assembly cylinder, and a handling section having at least two arms configured so that when the end of one arm faces the feeding section, the end of the other arm faces the insertion section. Each arm has a gripper for picking and releasing a hairpin, the gripper being slidingly mounted along an extension direction of the corresponding arm. The insertion section has an assembly drum moved by a rotary mechanism, both mounted on the same axis, perpendicular to the rotation axis of the arms. The assembly drum has a series of inserts on its outer surface defining a series of radially open slots, the rotary mechanism being sized to leave free space between the arm and the slots. A method for assembling a winding of hairpins is also provided.

27 Claims, 23 Drawing Sheets

(56) References Cited

U.S. PATENT DOCUMENTS

| 8,881,371 B2 * | 11/2014 | Guercioni | ................ | H02K 3/28 |
| | | | | 29/736 |
| 2013/0115029 A1 * | 5/2013 | Guercioni | .......... | H02K 15/0421 |
| | | | | 414/222.04 |
| 2019/0103792 A1 * | 4/2019 | Matsumoto | .......... | H02K 15/066 |
| 2019/0356188 A1 * | 11/2019 | Miyawaki | ................ | H02K 1/16 |
| 2021/0408879 A1 * | 12/2021 | Choi | ....................... | B21F 1/004 |

* cited by examiner a)     b)   FIG. 4A
(PRIOR ART)

N slots    N slots (a) (b)

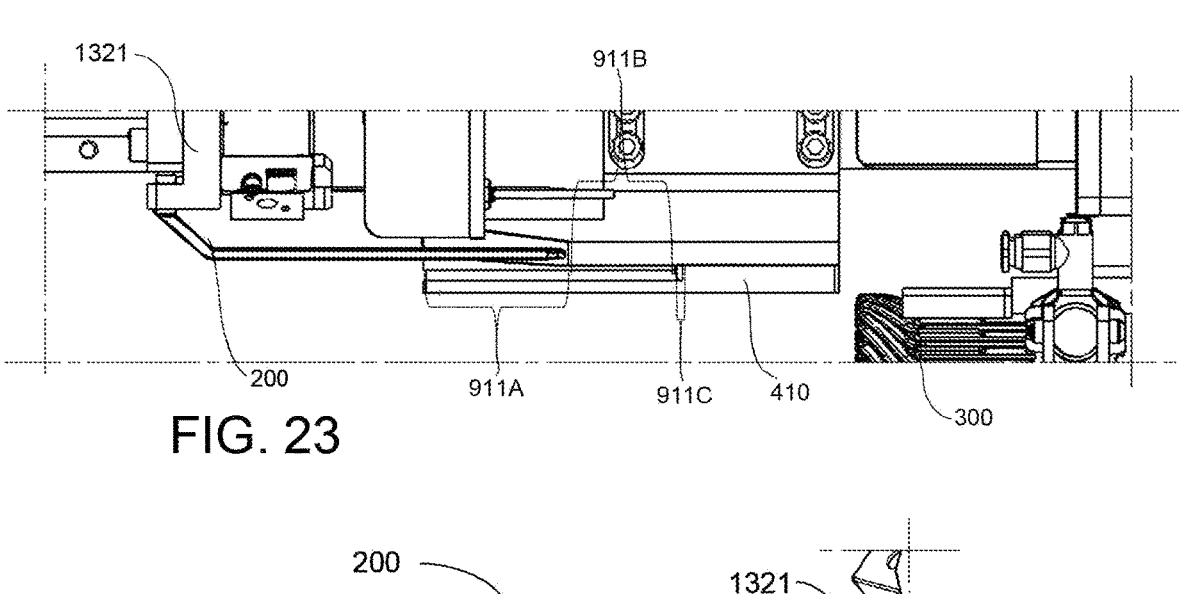
FIG. 23
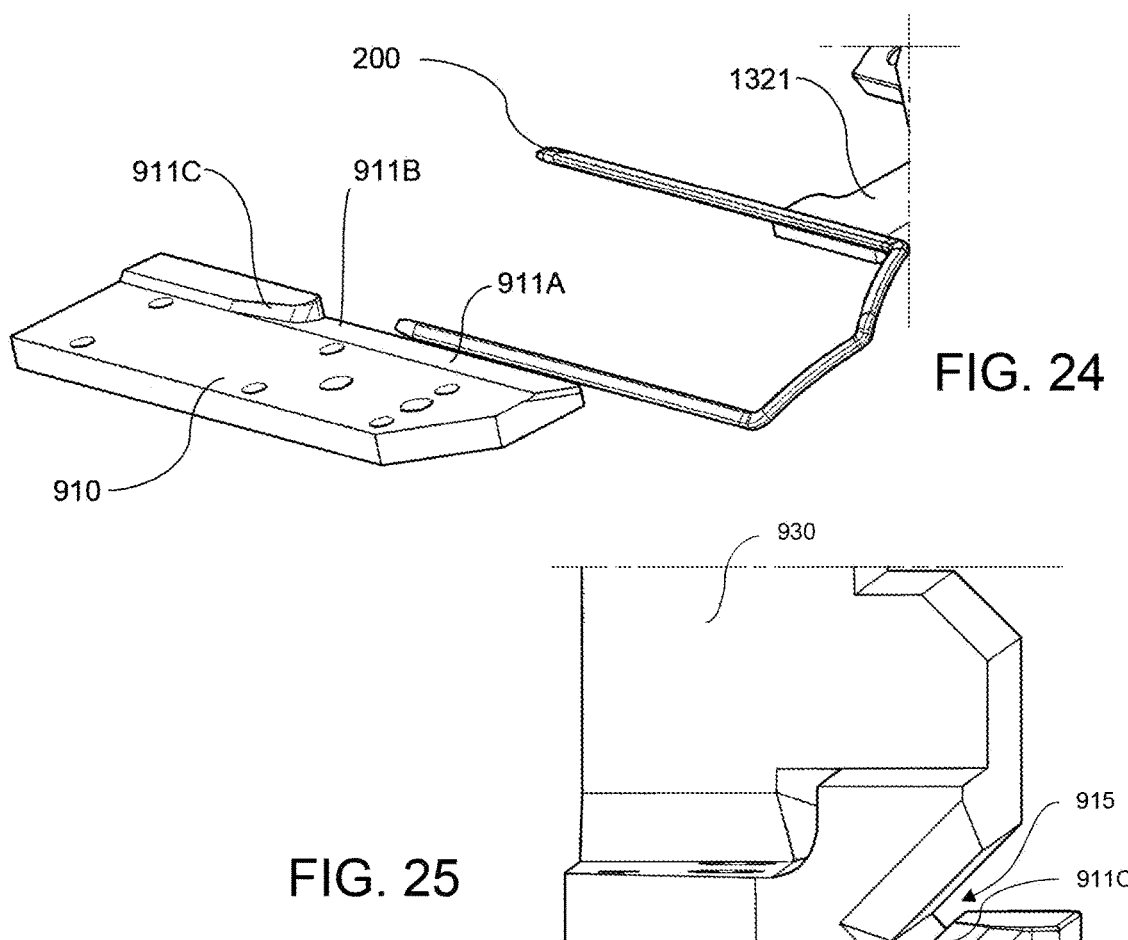
FIG. 24
FIG. 25
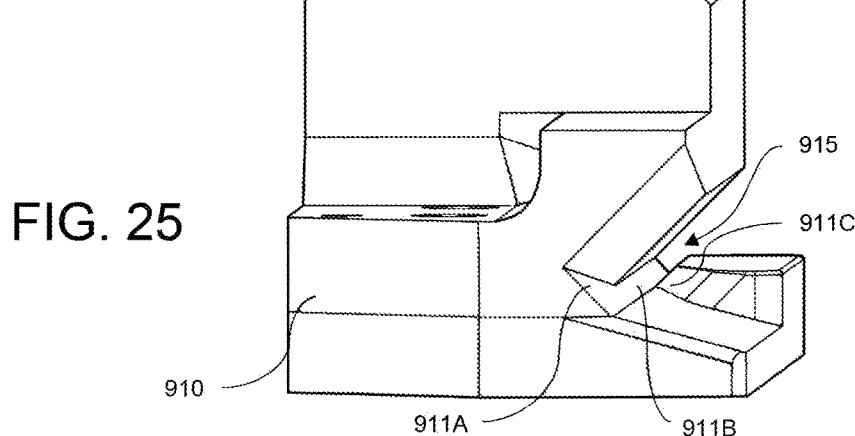

(a)    (b)

METHOD AND APPARATUS FOR ASSEMBLING A WINDING OF HAIRPINS

CROSS-REFERENCE TO RELATED APPLICATIONS

This application is a U.S. National Phase filing of PCT International Patent Application No. PCT/IB2022/055872, having an international filing date of Jun. 24, 2022, which claims priority to Italian Patent Application No. 102021000017636, filed Jul. 5, 2021 each of which is hereby incorporated by reference in its entirety.

FIELD OF THE INVENTION

The present invention relates to a method and apparatus for assembling a winding of hairpins or other conductors.

PRIOR ART

It is generally known to make the stators or rotors of electric machines, such as generators or electric motors, e.g., for applications on hybrid electric vehicles (HEVs), wherein the stator or rotor winding is formed by a plurality of bar conductors bent and variously interconnected to one another to made electric windings also known as "bar windings". Said folded bar conductors are also called "hairpin conductors" or simply "hairpins". The bar windings can be formed by one or more groups of concentric windings, sometimes known as "crowns", each group of windings, being already wound in itself ("winding sets").

In particular, windings with hairpins having a circular cross-section (also said "round-wire conductors") or a rectangular cross-section, or even conductors with a variable cross-section geometry along the length (e.g., round conductors made rectangular in the part accommodated in the slot) are known in the prior art. In this regard, "rectangular" or "square" conductor wire means in this description a wire having four substantially flat sides, each joined to the adjacent sides, typically by a rounded edge. Bar conductors having a trapezoidal-shaped cross-section are known.

The aforesaid basic conductors are usually preformed by means of bending in a "U" or a "P" starting from straight bar conductors. U.S. Pat. No. 7,480,987 describes an example of a method for preforming straight bar conductors to form hairpins. "U" or "P"-shaped preformed conductors, often also called "preformed basic conductors" in the technical field, typically have two adjacent legs, of equal or different length, each provided with a free end portion and an opposite end portion, which is connected to the other leg by means of a bridge-like connecting portion. Since the end portions protrude when they are inserted into the rotor or stator, they will henceforth be called "free protruding portion" and "opposite connected protruding portion". The protruding connected portion may also be called "head portion" or "bridge-like connected portions". The whole of the "head portions" of the legs of the same hairpin constitutes the so-called "bridge-like connection".

With reference to FIG. 1($a$), a hairpin 255 is preformed starting from a linear conductor (not shown) by bending it to form a first leg 255$a$ with a respective free protruding end portion 255$a$E and a second leg 255$b$ with a respective free protruding end portion 255$b$E. The bending shape forms at the same time a bridge-like connection 255C between the two legs 255$a$, 255$b$. The preformed hairpin, in this example, has a shape of a flattened "U". To form a stator of an electric machine, for example, it is known to subject the "U" or "P"-shaped preformed hairpins to two different types of twisting.

A stator or rotor core of a radial magnetic flux electric machine is essentially a ring having two flat faces and two cylindrical surfaces, having generators perpendicular to the two flat faces parallel to the rotation axis of the rotor of the electric machine. The radial, circumferential and axial directions hereinafter refer to the latter axis, unless otherwise specified. One of the two cylindrical surfaces is adjacent, at least in part, to the air gap of the electric machine, to which said stator or rotor belongs and defines a set of slots in which the straight parts of the winding are housed. The two flat surfaces are divided into the insertion surface or side and the surface or side opposite to the insertion side. The parts of the winding which protrude from said core are named headers. The ends of the free portions of the conductors belong to the header protruding from the side opposite to the insertion head, most of which are subject to welding. If protruding portions connected in a bridge-like manner with the legs inserted in the stator slots are present in the winding, they belong to the header protruding from the insertion side. The portions protruding from the insertion side, either free or connected in a bridge-like manner, are indicated hereafter as portions from the insertion side.

The stator or rotor core region between a slot and an adjacent one is named tooth. The number of teeth is equal to the number of slots. The connecting part of the teeth of the core, which also defines a portion of each slot and is located relative to it on the side opposite to the slot opening on the air gap of the machine, is named yoke.

The slot can be divided into an array of positions in each of which a leg of a basic conductor can be placed. The conductors housed in the same radial position of the slots define a so-called winding layer.

In a first type of twisting, also called "twisting from the insertion side", the preformed basic conductors are appropriately inserted in corresponding radially aligned pockets, which are provided in a twisting device, adapted to deforming such conductors after insertion. The twisting device is substantially used to spread the legs of the "U" or "P" shape so that the two legs of each conductor, after having extracted the conductor from the device, can be successively inserted into a corresponding pair of slots of a stator core, which are mutually angularly offset by a predetermined distance, substantially equal to the angular distance between the slots in which to the legs are successively inserted and radially distanced by the radial distance between the slot positions respectively occupied by the legs.

Starting from a preformed hairpin, for example, but not exclusively as shown in FIG. 1($a$), a hairpin of suitable shape for its insertion into the stator (or rotor) is formed by spreading the legs 255$a$, 255$b$ and shaping the bridge-like connection 255$c$, e.g., to obtain the shape in FIG. 1($b$). Reference numeral 255$p$ indicates the pitch of the hairpin, i.e., the linear distance or the angular distance, or the distance in terms of slot pitches, between the legs. It is worth noting that, again, in this case, the central top 255$c$2 of the formed hairpin is the zone in which the cross-section of the conductor is subjected to a 180° rotation relative to the median surface of the hairpin (the surface which passes inside the hairpin and includes the two legs). Said rotation is useful in some layered hairpins, which will be hereafter defined in order to transpose the layers (exchange of slot positions) thus reducing eddy currents circulating through the ends of the layers when they are welded together, compared with the case in which the same layers run parallel without exchanging the slot position in the transition from one leg to the other.

The patent application published under US 2009/0178270 describes an example of a twisting method from the insertion side for the twisting at a uniform pitch the preformed bar conductors after having inserted them into the pockets of a twisting device, in which the hairpins have a rectangular cross-section.

According to the prior art and with reference to FIG. 2, the hairpins may also be obtained by stamping, a process in which a straight conductor is pressed against a contrast in a punch and die type system. FIG. 2(*a*) shows such a stamped conductor; it does not have a cross-section which rotates relative to the median surface of the hairpin.

This stamped hairpin or also a preformed and spread hairpin, obtained as described above, may be subjected to so-called "twisting on welding side", in which case it is possible to introduce a "step-like" shape of the legs 255*a* and 255*b*, in which, for example, the leg 255*a* has a first straight portion 255*a*1, a step-like portion 255*a*2 and a second straight portion 255*a*3 (substantially corresponding to portion 255*a*E in FIG. 1), come in FIG. 2(*b*).

With reference to FIG. 3, the shape of the protruding portion on the insertion side, i.e., of the bridge-like connection 255*c*, for a stamped hairpin, may comprise three portions 255*c*1, 255*c*3, and 255*c*2 starting from the connection to the second leg 255*b* and finishing at the connection to the first leg 255*a* (hidden from view in FIG. 3). The portion 255*c*1 has a main extension direction B and a curvature radius RB, the portion 255*c*3 has a main extension direction A and a curvature radius RA, the portion 255*c*2 has a main extension direction C (and possibly a curvature, not indicated). Hereafter, the portion 255*c*2 is called the "layer change bend"; indeed, by virtue of it, the head and leg portions of the hairpins are on different layers when they are inserted into the respective slots of the stator pack. Reference $\alpha 1$ indicates the angle between the directions A and C, reference $\alpha 2$ indicates the angle between directions A and B and reference $\alpha 3$ indicates the angle between directions B and C, equal to the sum of the angles $\alpha 1$ and $\alpha 2$. This is only one of the final possible shapes of a hairpin, all other shapes with different portions and conformations of both the bridge-like portion and the legs can be used with the apparatus and a method according to the present description.

There are also conductors called "reverse" conductors; they are hairpins with the bending direction in the bridge-like connection opposite to one of most hairpins that form the same winding. These are used to go from the last layer of one crown to the first layer of the next crown. Furthermore, with reference to FIG. 4A, there is a layered ("stranded") hairpin with a reversing of the cross-section at the bending point (FIG. 4A(a)), which causes the exchange of the position occupied by the layers.

As can be seen from the hatching of the cross-section type in FIG. 4A(a), by virtue of said reversal or exchange of position, the upper layer in the pair of layers in the left slot is below the other one in the right slot. In another hairpin form, the transposition can be continuous along the portions of the hairpin accommodated in the slot (FIG. 4A(b); U.S. Pat. No. 3,837,072). The variant shown in FIG. 4B is a layered hairpin free from reversal, shown in U.S. Pat. No. 8,552,611 B2. FIG. 4C (taken from FIG. 6 of U.S. Pat. No. 6,894,417 B2) shows the variants of the arrangement of the legs of the layered hairpins in a double crown winding in different positions in the slot. Reference letters A and B indicate the crown to which the legs that are shown in the slot (belonging to different hairpins) belong.

Furthermore, there are conductors named "I-pin", i.e., a conductor to be accommodated in a single slot and, when in the slot, having the portions with free ends protruding from both flat faces of the stator core. FIG. 4D shows an example of an I-pin, which does not necessarily have to have all the direction changes shown because it can also have none, and be bent from the output side of a hairpin winding assembly drum. The ends of the I-pin can be welded to ends of other conductors protruding from the slots or to third-party elements (e.g., bus bars, eyelets) or they can serve as phase terminals. The portions may be subject to bending of the "welding side" type. An example of an I-pin can be found in the conductors shown with references 81-83 in document US762284362. "W-shaped conductors" are also known, see for example U.S. Pat. No. 7,622,843 B2 again and FIG. 4E. A W-shaped conductor may be formed by welding a stamped hairpin with an I-pin or by welding a fourth conductor to three I-pins. Once again, the W-pin does not necessarily have to have all the direction changes shown, it can also have none, and be bent from the output side of the hairpin winding assembly drum.

With reference to FIG. 4F (obtained from U.S. Pat. No. 10,749,399B2), there is also the so-called "inversion hairpin," i.e., a hairpin that can be formed by spreading the leg (not with the insertion-side twisting method described above) or stamped with "press and die" systems, characterized in that the legs in their respective slots occupy the same radial position, i.e., belong to the same layer. Therefore, its ends will be bent in the same direction on the twisting side. In actual fact, the protruding portions on the side of the bridge-like connection can be folded in the same tangential direction or can assume a V shape. At least two layer change bends may be required on the connecting portion.

Finally, there are hairpin pairs the homologous legs of which belong to different layers (FIG. 4G) or to the same layer (FIG. 4H) and are configured and sized to be overlapped.

Hereafter, all the "hairpin" types and the I-pins and the W-pins will be included in the definition of "basic conductors".

After having been subjected to the first type of twisting or after they have been stamped, the basic conductors are typically pre-assembled in a winding set as mentioned above. The pre-assembly apparatus will have a series of slots, generally in number equal to the slots of the stator associated with the winding, into which to insert the legs of each hairpin, and will generally be different from the twisting device.

The winding set is then inserted in the block into the slots of the stator core through a first side thereof (so-called "insertion side" or "insertion face") with the respective free portions protruding from a second side of the core (so-called "welding side" or "connection side" or "welding face" or "escaping face") opposite to the first side.

Based on the specific winding pattern to be achieved, the free portions of the basic conductors protruding from the side opposite to the insertion side may be subjected to a second type of twisting, also named "twisting from welding side", e.g., after having been inserted in pockets made in an appropriate twisting fixture. The twisting fixture herein has the purpose of bending or twisting the free portions of the conductors to appropriately shape said free portions and consequently make it possible to perform the appropriate electric connections between the conductors to complete the winding. A patent application published under number US 2009/0302705 describes an example of a twisting method from the welding side of the type discussed above.

With reference to FIG. 5A, the Odawara patent application US2019/0190359, and also the application US 2019/0356188 by the same owner, describes a system of forming basic conductors and subsequently assembling them into a winding, which is then inserted into the stator, with a single plant. Odawara application US2019/0190359 mainly describes the basic conductor forming section, while application US 2019/0356188 describes the winding assembly and insertion section, with a large overlap relative to the latter. The applications, relative to the winding assembly and insertion section, mention "guiding means", which are the ones depicted for example in FIG. 24A of application US2019/0190359 by reference numeral 112, which is reproduced in this description as FIG. 5A (the figures of application US 2019/0356188 related to the same apparatus are identical, as is the technical content related to them). Odawara application refers to describes the following parts:

in-line forming (albeit with partial rotations of some elements) of the basic conductors;

the sliding guide means 112;

the radial approach of the basic conductors 17S towards slots 109 formed between radial elements (blades) 108 (oriented in the radial direction of the drum section perpendicular to its rotation axis C) and then radially open to the outside of the drum 105;

the fact that the dragging gear 123 of the cylinder 105 has a larger diameter than the latter.

Furthermore, with reference to FIG. 29 of Odawara, FIG. 5B of the present description, it is apparent that the gear mechanism 123 is such to ensure the rotation precision of the drum 105 by the servomotor (see paragraph 205 of the mentioned application) and thus is essential to the solution.

Furthermore, the blade handling mechanism 108 of the cylinder has a rotary axis 121 that sets cams 130 in motion, and that must be actuated axially by acting on another element 129 connected to the axis 121, and not on the wheel 123 (FIG. 31, shown here as FIG. 5C). The wheel 123 and the crown 135 are adapted for the extraction of the winding and thus must have a larger radius than the drum and blades, while being arranged in axis. Said mechanism requires the insertion of the hairpin in the radial direction.

Indeed, in Odawara, the insertion system into the stator requires a thrust crown 135, as shown in the corresponding FIG. 34 and FIG. 5D of the present description.

This overall configuration has several disadvantages, including that the hairpin insertion is performed with approach movement to the drum with radial and circumferential components. The co-presence of said two movements makes a confinement system of the first leg (non-gripped leg) of the hairpin, which can keep up with an excessively complex high hairpin forming cadence (e.g., 1.5 s). Furthermore, in the prior art, there is low accuracy of insertion of the hairpin legs into the assembly drum due to the type of hairpin handling (in some cases with both radial and circumferential handling). It is also worth noting that in the prior art, there is a high possibility of undesired leg movement in the drum slots (with possible escaping) because the Odawara guide must remain at a distance from the drum (at least temporarily) for radial insertion of the basic conductor to be possible. Even adding standard confinement, preserving the aforesaid movement would complicate the rest of the apparatus.

A stator winding assembly system by the Applicant is also known from patent document WO 2012/007973 A1. In said document, a hairpin gripping system is described as consisting of multiple grippers mounted on a rotating base. The grippers move from a position, in which a hairpin is fed to a position in which the hairpin is inserted into a stator winding assembly drum. However, the hairpins are not inserted into the drum of the grippers; instead, a sliding blade is operated, which moves the hairpin taken by the gripper (that does not move) until the legs are simultaneously inserted into the slots of the drum. This is possible because the slots of the drum have a gap that extends parallel to the axis of the drum and the insertion blade, and also by virtue of the fact that the rotating base is actually above the drum, i.e., its protrusion along the axis of the drum meets the drum itself.

The use of the system in WO document 2012/007973 A1, in addition to being mechanically incompatible with the Odawara system, prevents the subsequent direct insertion of the formed winding into the stator itself. The winding must be extracted in the direction from which the hairpins were inserted, moved to another location, and inserted into a drum. The cycle time is thus considerably high, and a series of drum mechanisms are needed for the correct concatenation and compacting of hairpins. Furthermore, the use of the insertion blade involves significant problems of mechanical precision. The entire apparatus is expensive and poorly productive.

The need is felt for an apparatus and method of assembling basic conductor windings which has a simple construction, short cycle time, and which possibly allows the direct insertion (in the axial direction without displacement to a different position) of the assembled winding into the stator.

SUMMARY OF THE INVENTION

It is an object of the present invention to provide an apparatus and method of assembling basic conductor windings which solves the problems and overcomes the disadvantages of the prior art, either entirely or partially.

It is subject matter of the present invention an apparatus and a method according to the accompanying claims.

BRIEF DESCRIPTION OF THE FIGURES

The invention will now be described by way of example, with particular reference to the drawings of the accompanying figures, in which:

FIG. 4A shows in (a) a layered ("stranded") hairpin with reversing of the cross-section at the bending point and in (b) with continuous transposition along the hairpin portions housed in a slot, according to the prior art;

FIGS. 23-25 illustrate the same situation as FIGS. 21 and 22, in which the hairpin is shown in the position it occupies at the end of the rotation of the arm;

DETAILED DESCRIPTION

It is worth noting that hereinafter elements of different embodiments may be combined together to provide further embodiments without restrictions respecting the technical concept of the invention, as a person skilled in the art will effortlessly understand from the description.

The present description also refers to the prior art for its implementation, with regard to the detail features not described, such as, for example, elements of minor importance usually used in the prior art in solutions of the same type.

When an element is introduced, it is always understood that there may be "at least one" or "one or more".

When a list of elements or features is given in this description it is understood that the invention according to the invention "comprises" or alternatively "consists of" such elements.

In the following description, the "winding" or "winding set" is understood to be either complete or in its partial assembly stage.

EMBODIMENTS

Figure 1:
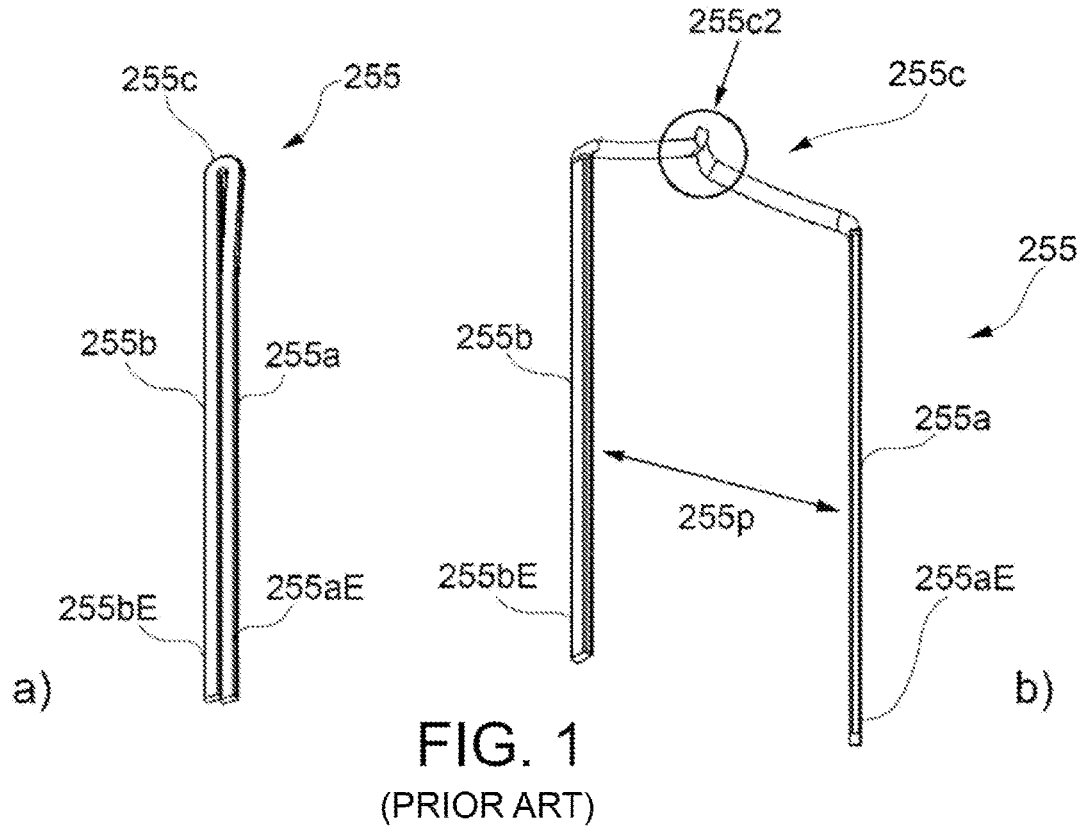
FIG. 1 shows in (a) a flattened preformed "U"-shaped hairpin, and in (b) a formed hairpin, according to the prior art.
Figure 2:
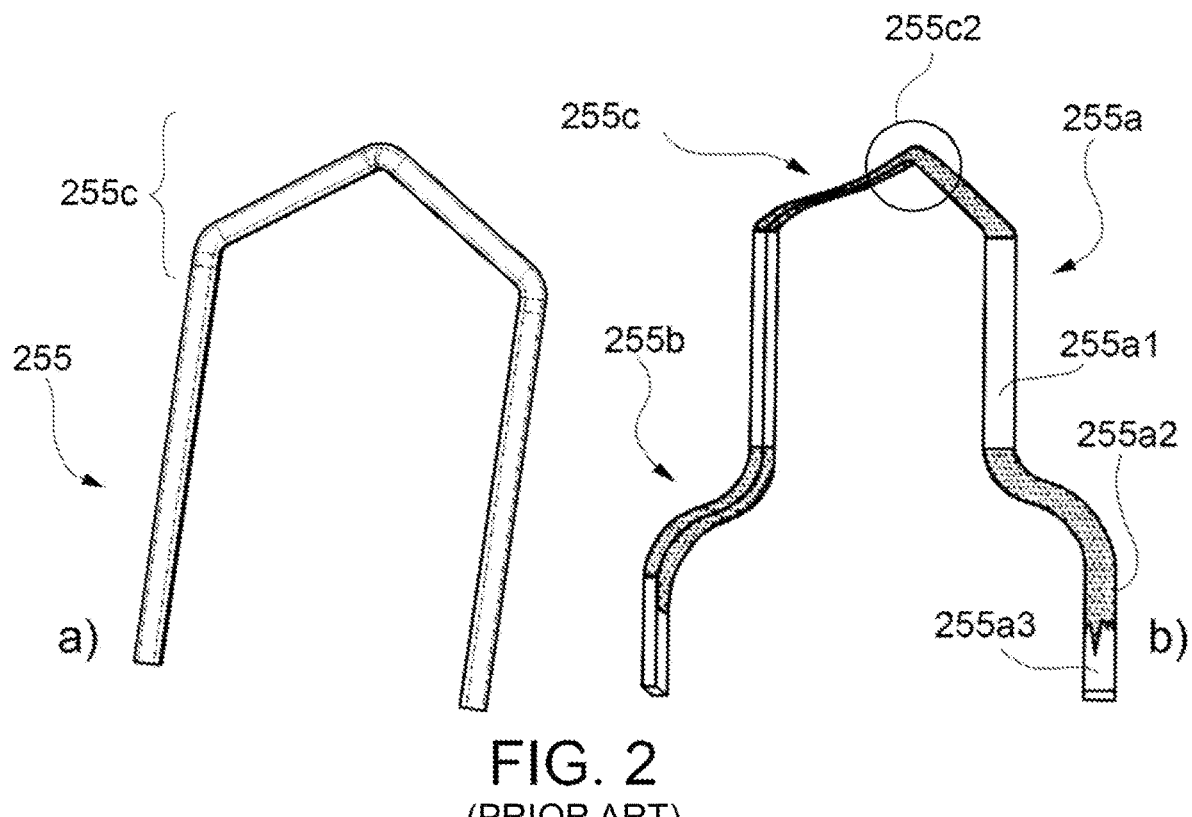
FIG. 2 shows in (a) stamped conductor and in (b) a conductor after having been subjected to twisting on the welding side.
Figures 3, 4B, 4C:
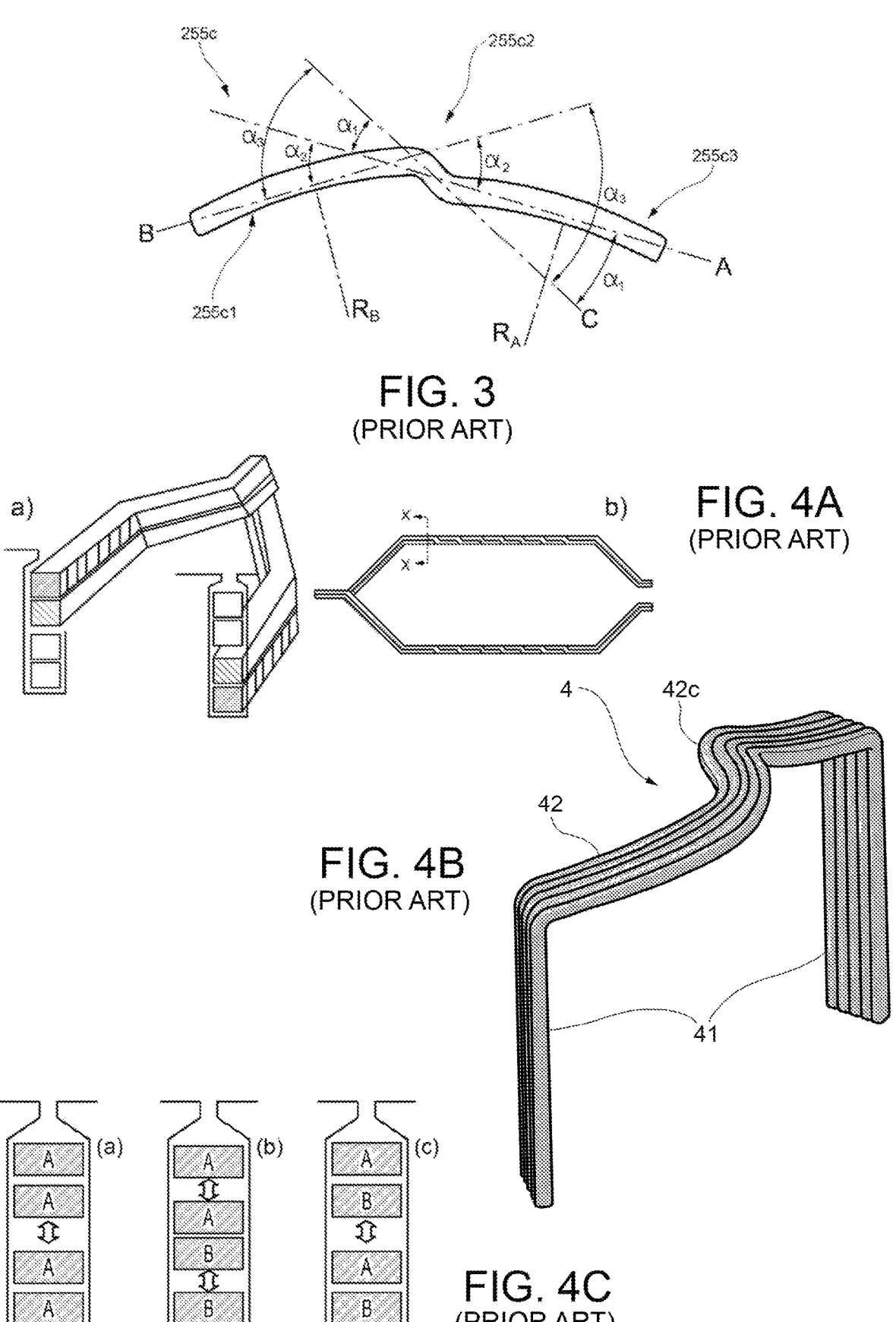
FIG. 3 shows the hairpin of 2(a) above, according to the prior art.
FIG. 4B shows a type of layered hairpin.
Figures 4D, 4E, 4F, 4G, 4H:
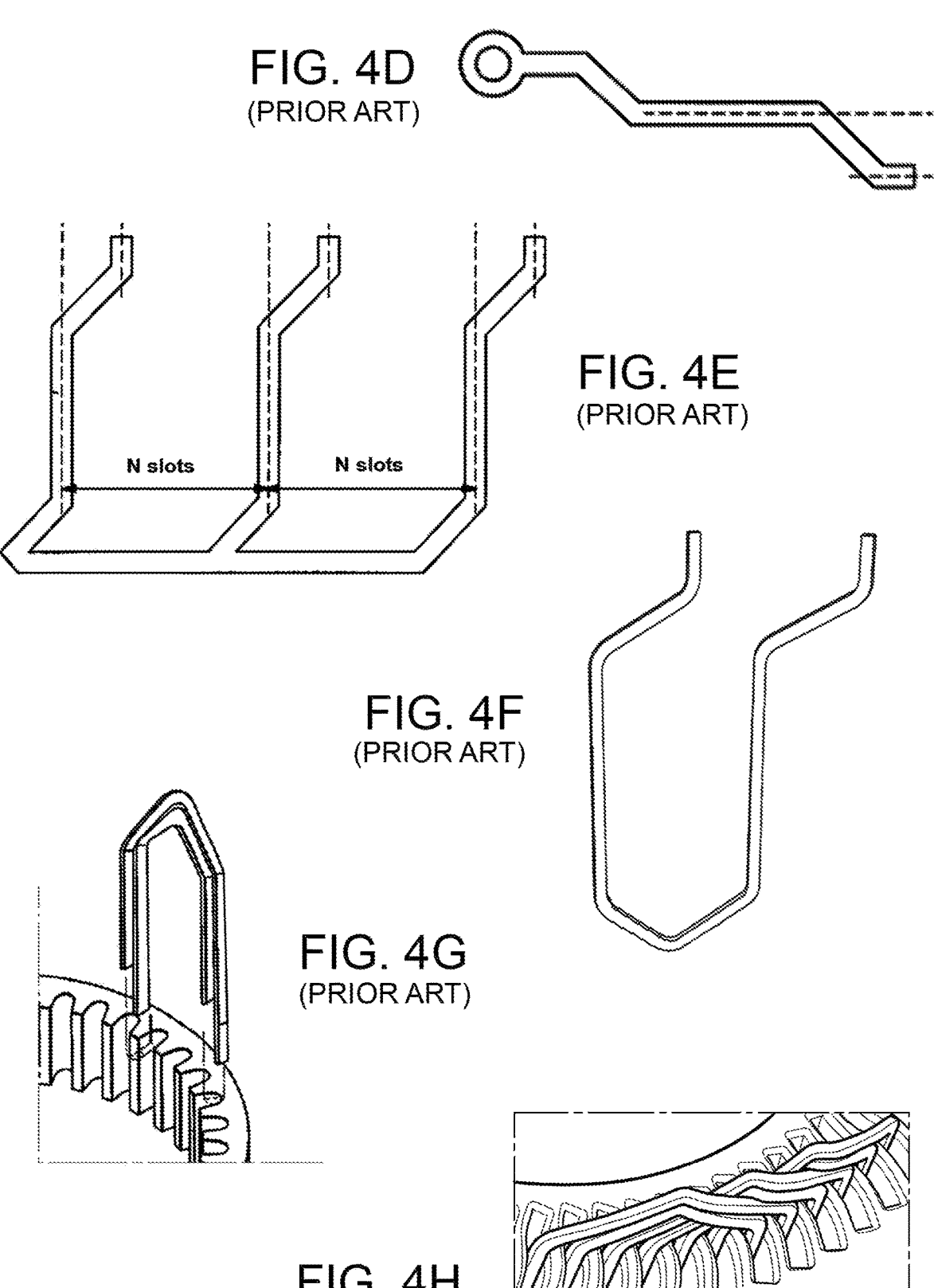
FIG. 4D shows an example of I-pin, according to the prior art.
FIG. 4E shows an example of "W-pin," according to the prior art.
FIG. 4F shows an example of an "inversion hairpin," according to the prior art.
FIG. 4G shows an example of overlapping hairpins on different layers, according to the prior art.
FIG. 4H shows an example of overlapping hairpins on the same layer, according to the prior art.
Figures 5A, 5B:
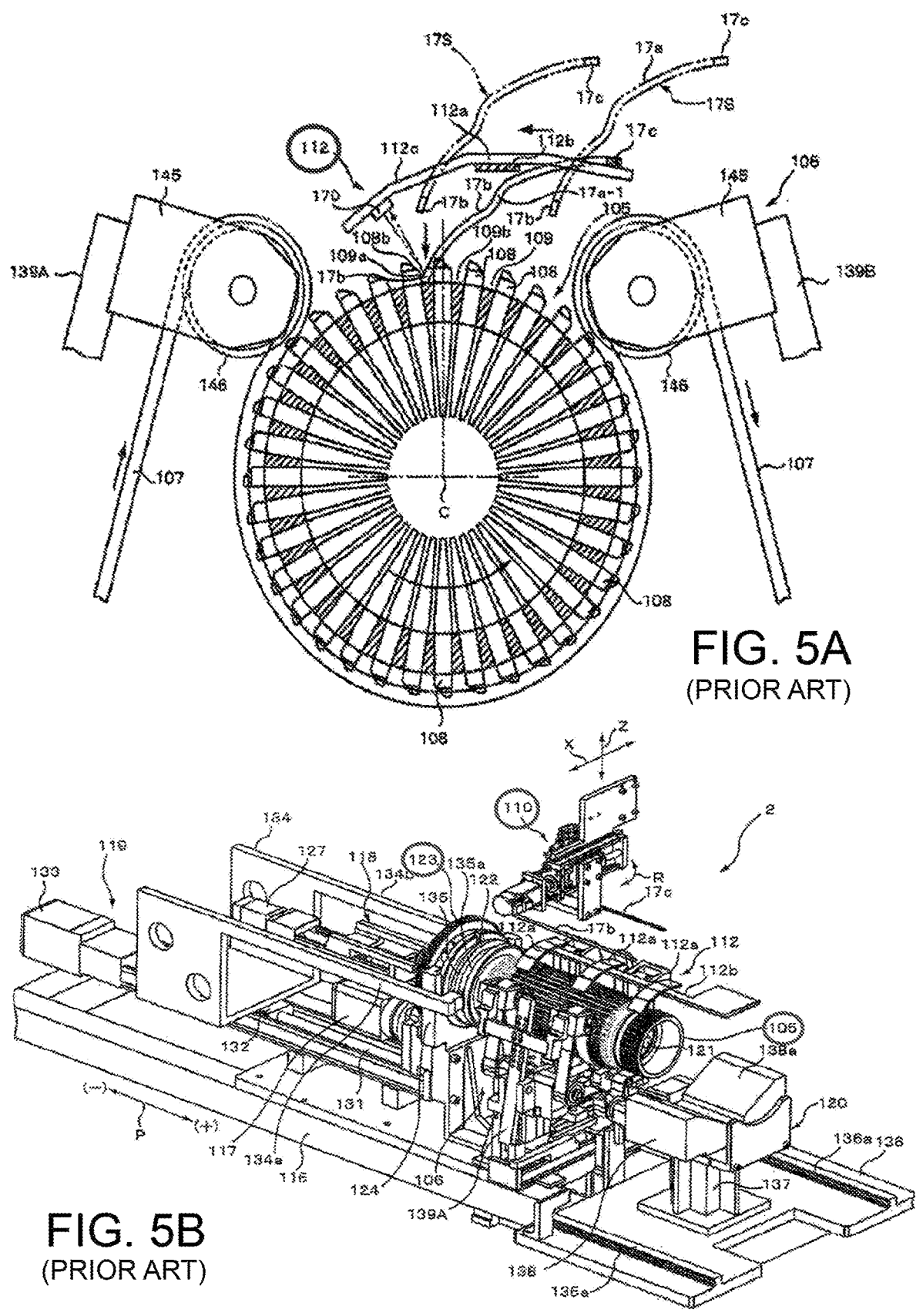
FIGS. 5A-5C correspond to FIGS. 24A, 29, 31, 34 of Odawara patent application US2019/0190359, where some elements commented above have been circled.
Figures 5C, 5D:
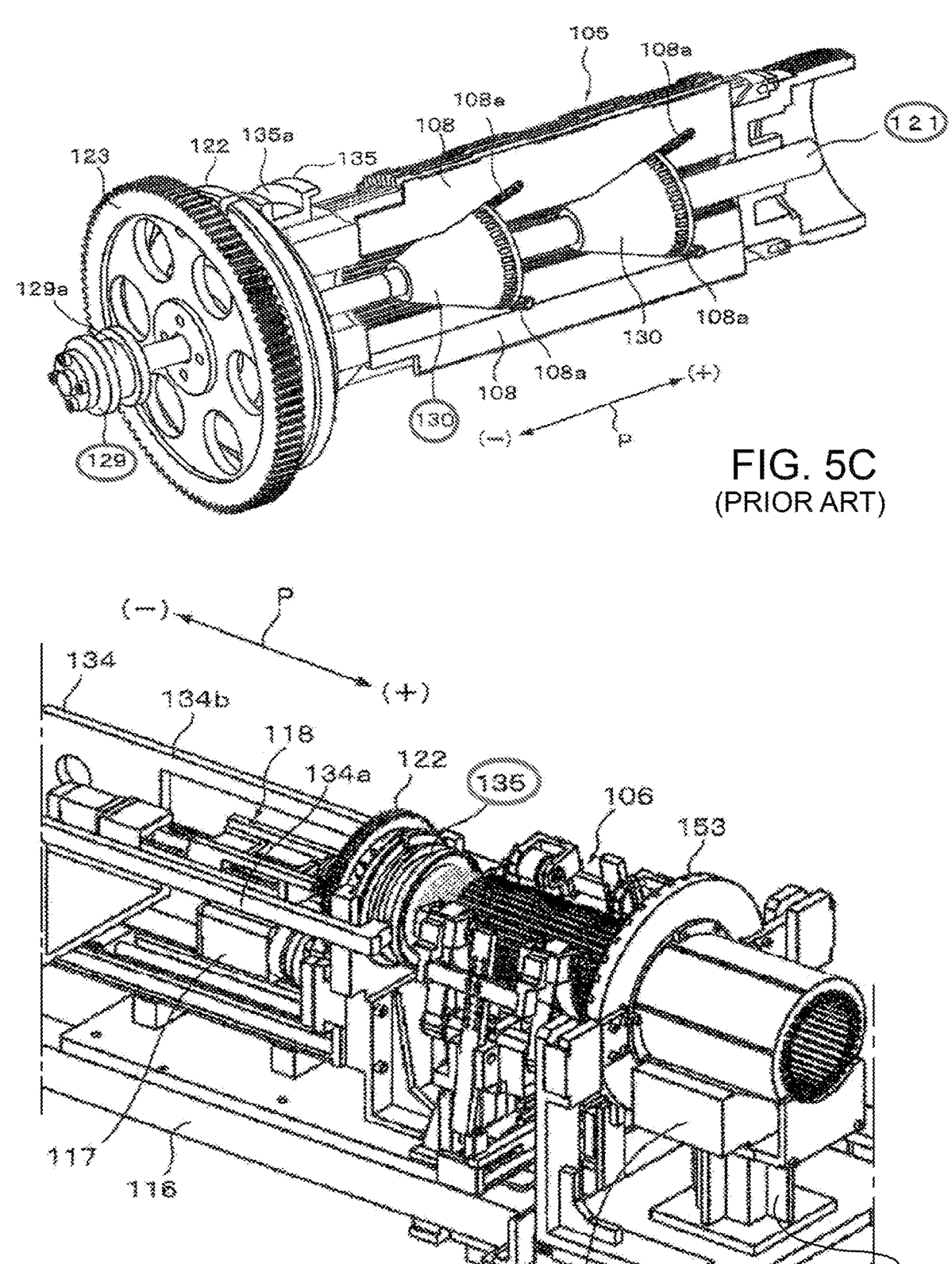
Figure 6:
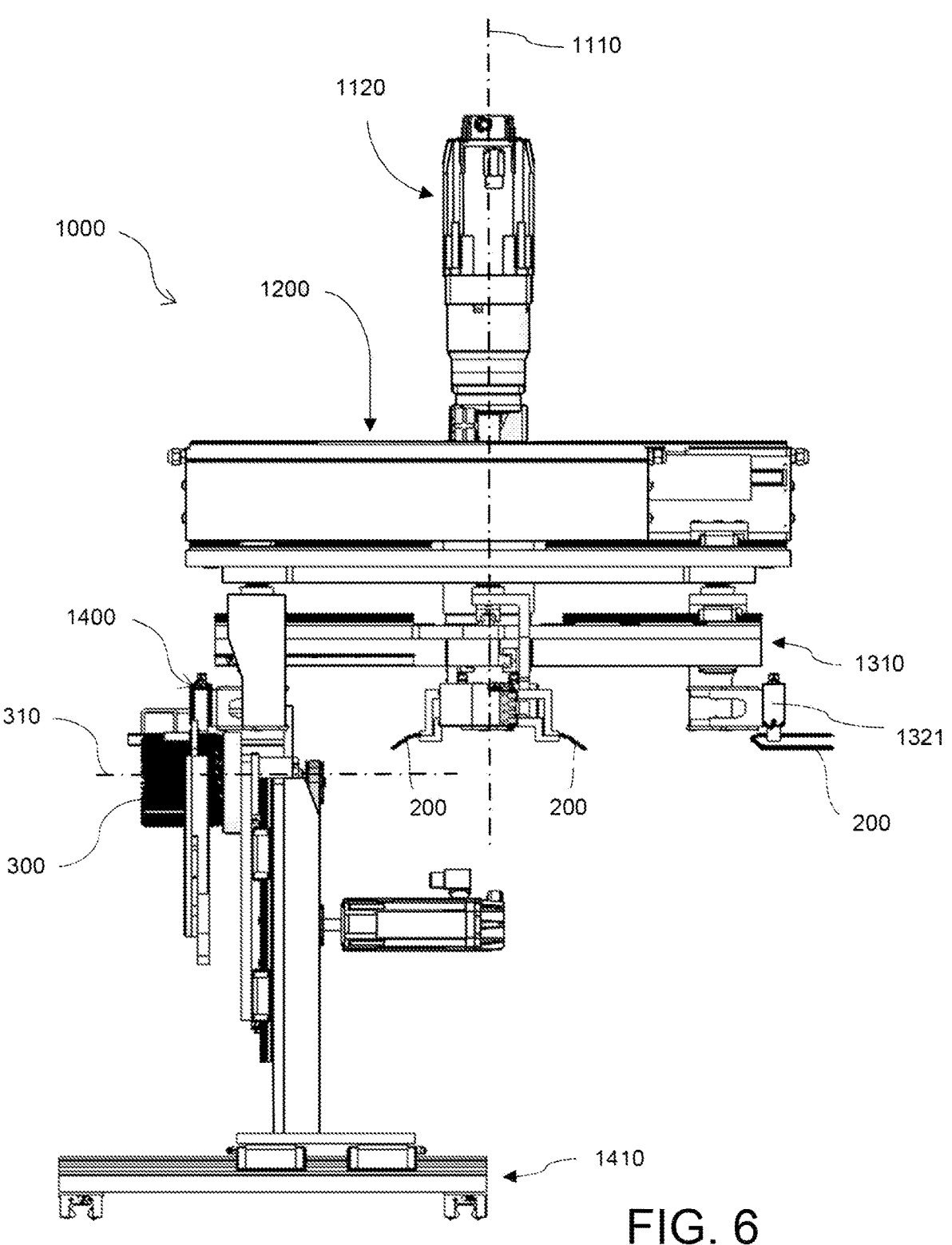
FIG. 6 shows a side view of a possible implementation of the apparatus according to the invention.

In FIG. 6 shows a side view of a possible implementation of the apparatus 1000 according to the invention. A table 1200 which supports a motor 1120 with the rotation axis 1110 is provided. Said rotation is transferred to a central element with a series of radial arms 1310 (4 arms in the example; in general, either 1 arm or an even number of arms) each comprising, at the far radial end, a gripper 1321 for gripping and transporting hairpins or basic conductors 200 (conventionally including any of the known types described above, including the reverse hairpin hereafter referred to as 200R).

Figures 7, 8:
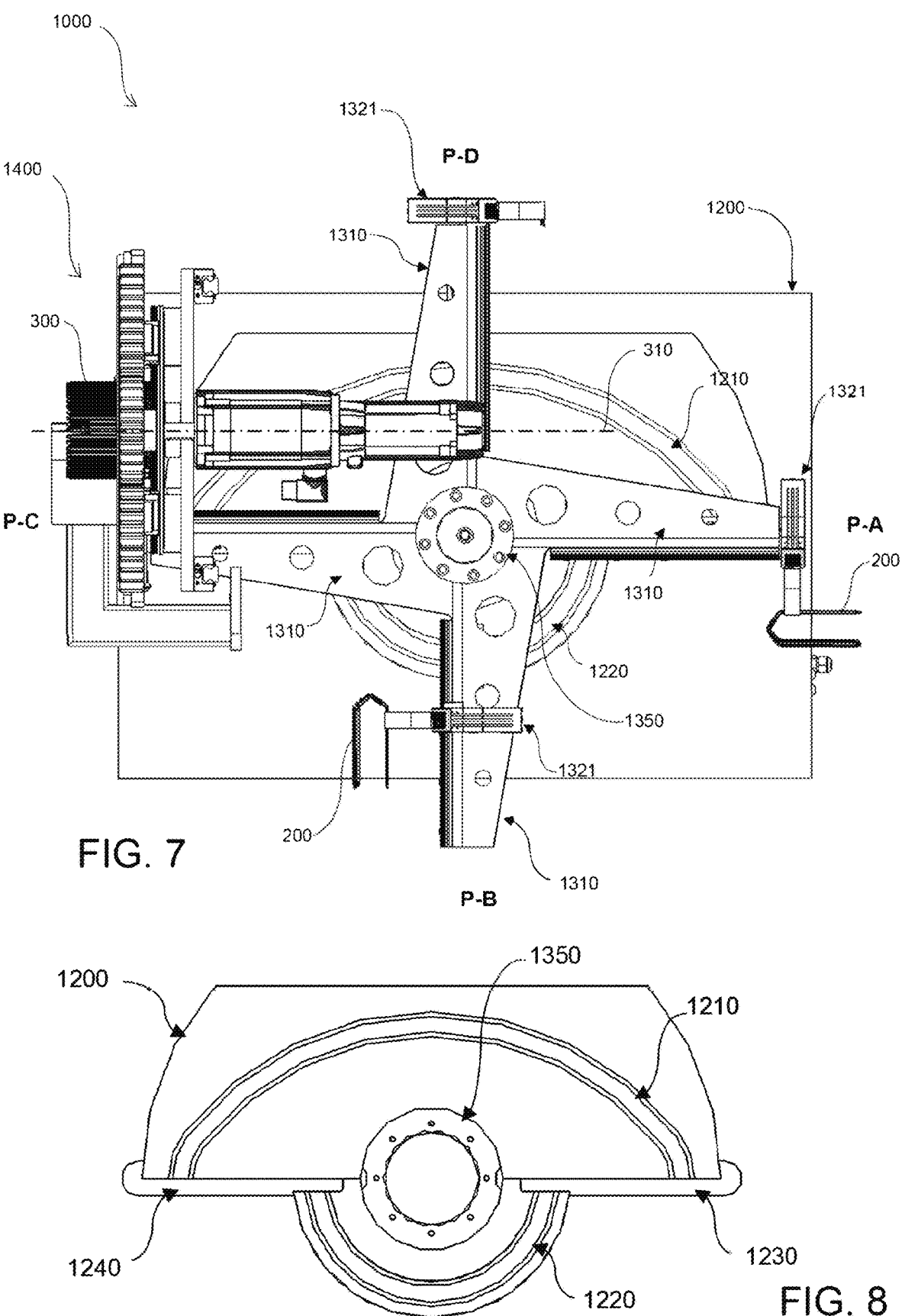
FIG. 7 shows a view from the bottom of a possible implementation of the apparatus according to the invention.
FIG. 8 shows the guides of FIG. 7 without the presence of the arms.

Each arm 1310 carries at least one hairpin from a collecting or feeding zone (not shown) on the right of the figure to the assembly section 1400, which rests on a base 1410 and supports an assembly frame, also referred to as assembly drum, or simply drum 300 with slots adapted to accommodate one or more legs of the basic conductors (shown in successive figures). The assembly frame 300 has a cylindrical shape with axis 310 placed perpendicular to axis 1110 of rotation of the arms 1310. FIG. 7 shows a view from the bottom of the apparatus 1000 in FIG. 6. This figure shows the movement of the gripper 1321 connected to it. At the position indicated by P-A, the gripper picks the basic conductor from a basic conductor feeding area. Immediately after having grasped the basic conductor, the gripper 1321 is retracted radially toward the center 1350, e.g., through a specific connecting guide 1230 shown in FIG. 8 (showing the guides without the presence of the arms). At this point, the arm which took the basic conductor is rotated by 180° following the guide 1220, passing through the lower intermediate position P-B until the gripper 1321 and the basic conductor 200 are facing the assembly frame 300, with the direction of the leg(s) parallel to the axis of the frame 310. In said position P-C, the gripper 1321 is again moved radially, but away from the center 1350, until at least one of the legs of the basic conductor is inserted at least partially into a corresponding slot (not shown) of the assembly frame 300. Once this has been accomplished, preferably without the need for further radial movement, the gripper detaches itself from the basic conductor (from its end where it was gripped) and rotation can continue clockwise constrained by the guide 1210 by passing through the upper intermediate position P-D and returning to the picking position P-A, thus concluding the loading/unloading cycle. Obviously, since there are four arms in this example, the speed is quadrupled compared to a possible presence of only one arm, because with each 90° rotation there can be gripping in position P-A and insertion into the frame in position P-C. In general, if N is not equal to 1, the rotations of the star of arms are made at intervals of N/2 equal angular steps, with N number of arms.

As a preliminary step in the axial insertion of a basic conductor into the drum, the initial position of the drum (position around its axis of rotation) can be such that any of its slots are aligned with the insertion direction of the basic conductor.

According to a preferred aspect of the present invention, the gripper does not make complex movements, which include rotation relative to an axis other than that of arm rotation. A single circumferential track can be used with the 180° breaks necessary for radial movement, i.e., 1220 would be at the same radial distance as 1210.

Figures 9, 10:
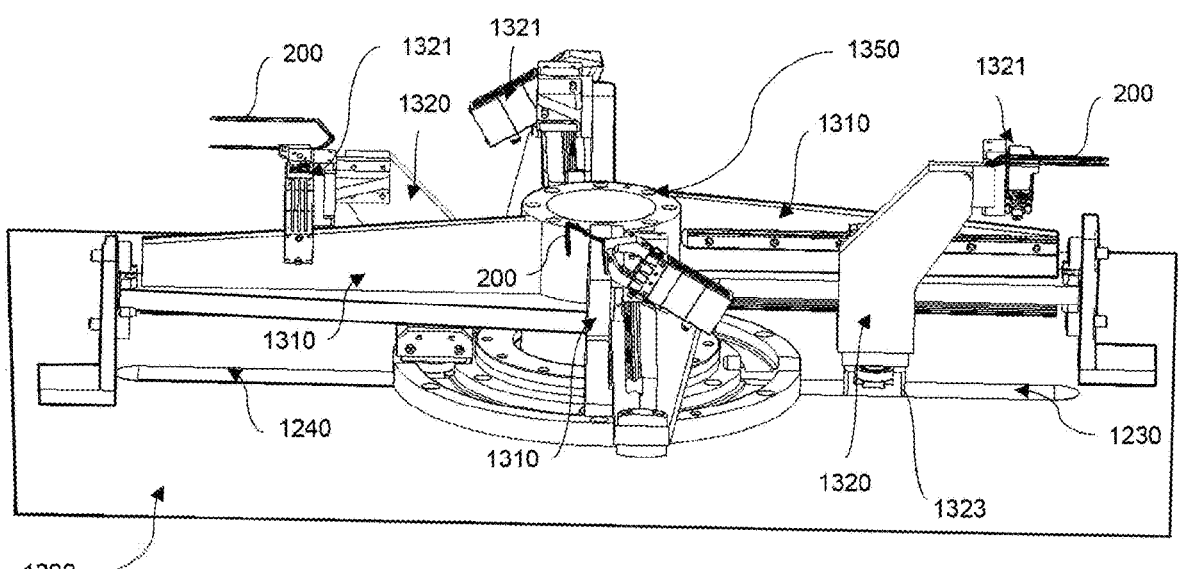
FIG. 9 shows a slightly perspective view of the arms in the preceding figures.
FIG. 10 shows an example of a radial movement mechanism of the gripper holder carriages along the arms in the preceding figures.

With reference to FIG. 9, it can be observed that the gripper support element 1320 may be a carriage which is moved radially by a blade, which slides, on a case-by-case basis, either in guide 1230 or guide 1240 with a slider on the opposite side (see below).

Figures 11, 12:
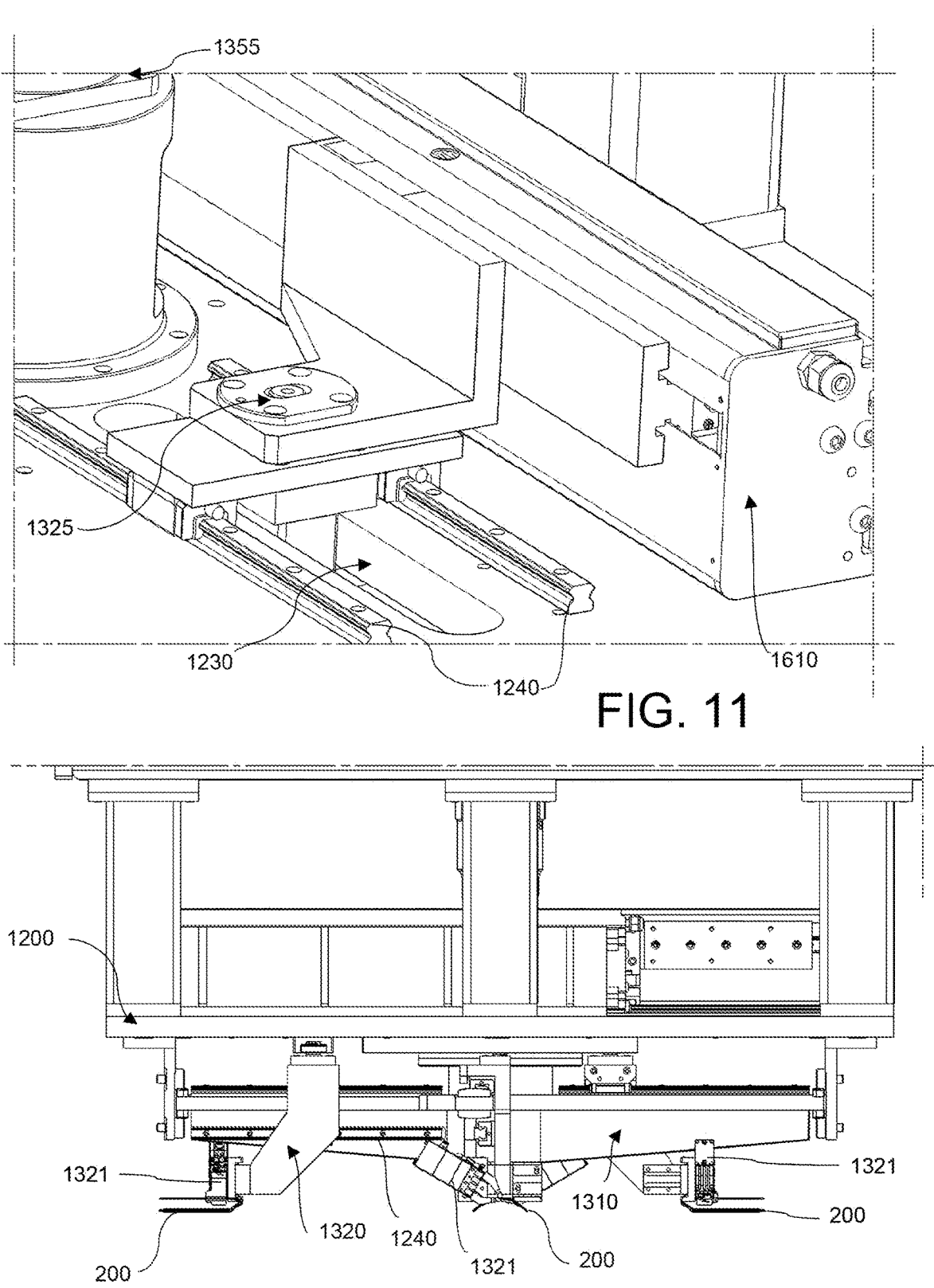
FIG. 11 shows a perspective view of a portion of FIG. 10.
FIG. 12 shows a side view of the arm movement section above, with the radial guides for the grippers.

The part of the arm mechanism on the other side of table 1200 is shown with reference to FIGS. 10 and 11. It is worth noting motor 1355 which makes the cross arms rotate at the opposite end of the central axis 1350, as well as the guides 1240 for the radial sliding of the blade and then, by motion transmission, of the carriages 1320 moved by sliders 1615, 1625 illustrated in two sliding positions (the second is indicated by 1615',1625'). Such sliders are set in motion by the linear motors 1620 and 1610, respectively. Reference numeral 1325 shows the actuating element of the radial movement of the blade and thus, by the transmission of motion, of the gripper (not shown) is connected to the carriage 1320. The element 1325 is driven by a specific motor 1620 and is connected to a "U" shaped element 1323 of the carriage 1320 which surrounds the slider 1322.

FIG. 12 shows a side view of the above arm movement section with the radial guides 1240.

Figure 13:
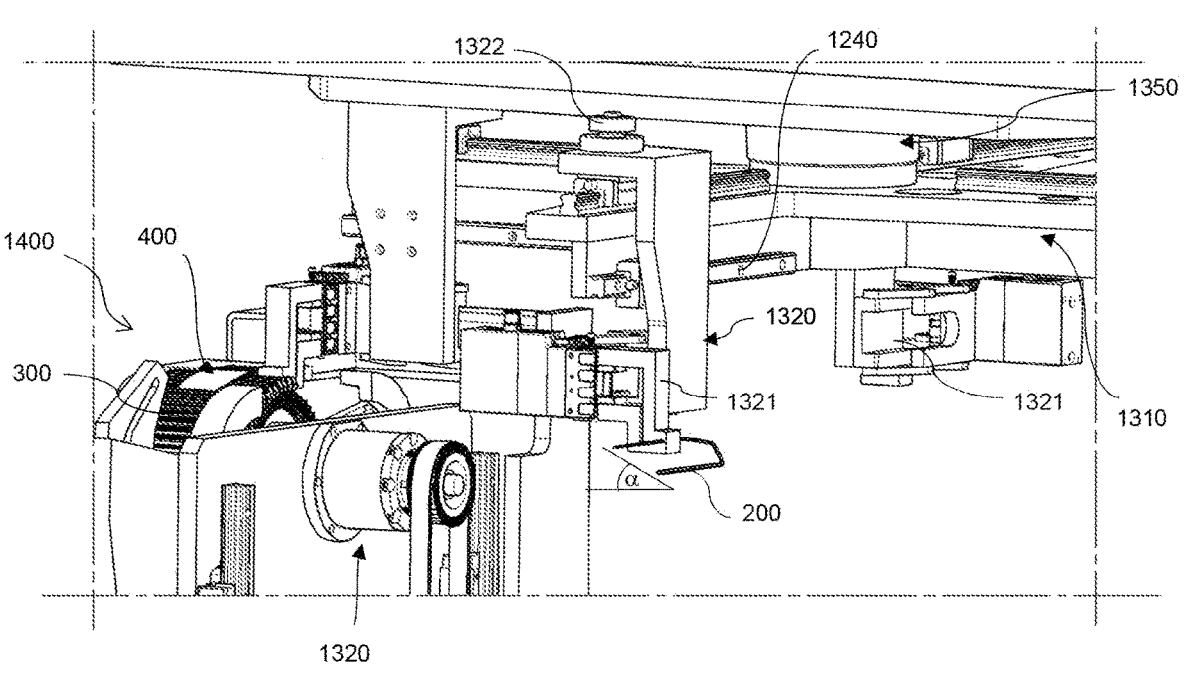
FIG. 13 shows a side perspective view of the arms, together with a portion of the winding section, wherein a is an inclination angle of the plane of the two legs of the basic conductor relative to the movement plane of the arms.

FIG. 13 shows a side perspective view of the arms, along with a portion of the assembly section 1400. In addition to the elements in the preceding figures, it shows the slider 1322 of the arm 1320 (intentionally brought outside the guide 1230 or 1240, i.e., to a position it cannot take in normal operation to make it visible) made to slide in the semi-circumferential grooves (not shown), as well as the assembly frame 300, moved in rotation by the pulley system 1320, by way of example. It also shows a sliding guide 400 over a portion of the assembly frame 300, which will be better explained later. Instead, it can be immediately noted here that there is a (free) gap between the direction of approach of the basic conductor 200 and the upper part of the assembly frame 300; thus, there are no obstacles to the radial approach (parallel to the axis of rotation/symmetry of the frame) of the basic conductor and the insertion of at least one of its legs into a slot of the assembly frame 300 itself. In other words, a circumferential sector of the cylindrical assembly frame 300 is unobstructed in the axial direction; this can be conveniently achieved by acting on the shape and arrangement of the rotation mechanism of a cylinder. In other words, the gap of the drum slots (described in greater detail below in an embodiment) extends in the radial direction of the drum and along the drum axis, the gap being open in the radial direction outward from the drum and passing parallel to the drum axis.

Figure 14:
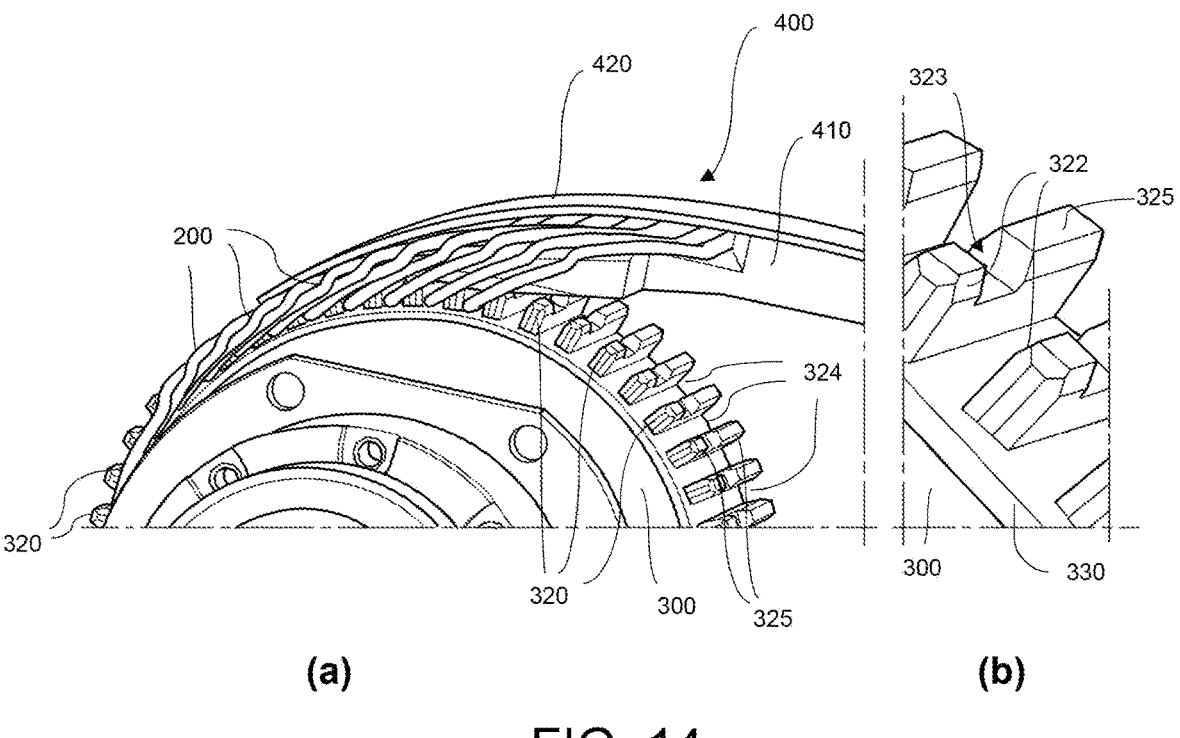
FIG. 14 shows in (a) a detail of a conformation of a portion of the assembly section, with the assembly cylinder or drum, guide and guide containment element, and in (b) a detail of the retractable elements of the assembly cylinder according to an embodiment of the present invention.
Figure 15:
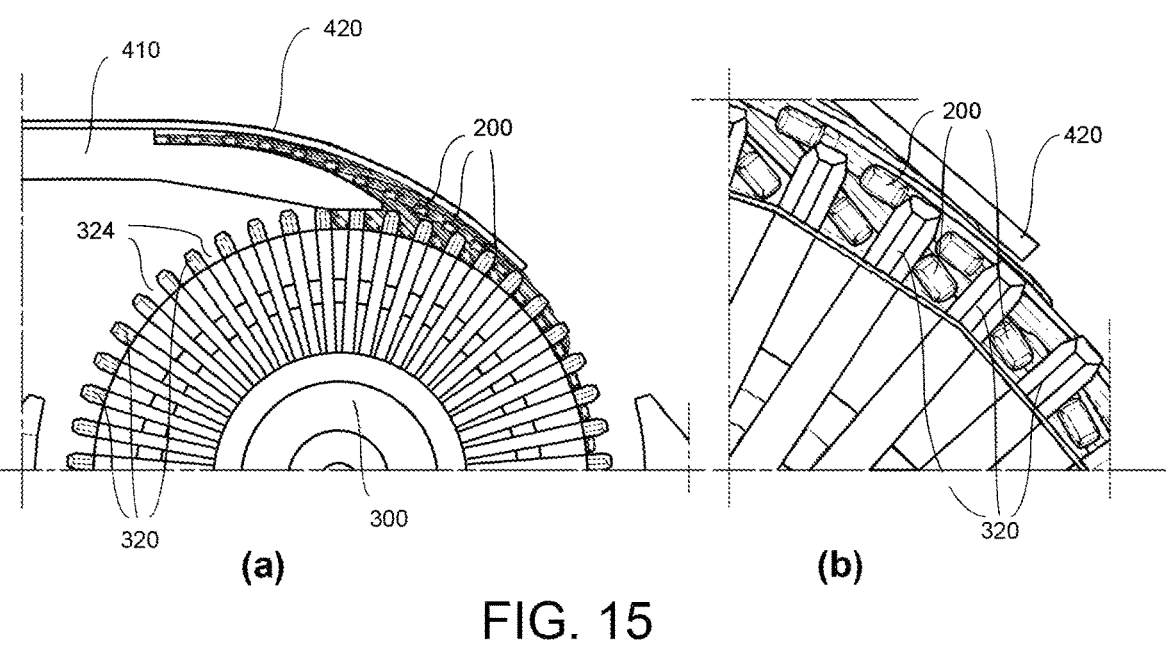
FIG. 15 shows the dragging of the hairpins inserted into the assembly drum, in (a) on the upper semi-circumference of the cylinder and in (b) in greater detail on a small arc of circumference.

With reference now to FIG. 14, the assembly frame 300 is shown as a cylinder shape which may comprise a surface layer 330 and with retractable inserts 320 (arranged circumferentially on the drum, i.e., on the outer cylindrical surface of the drum) which mutually define slots 324 (having a gap as in the preceding paragraph) between them. The retractable inserts may have a radial extension direction and an axial extension direction, as well as a thickness in the circumferential direction. FIG. 14 (*b*) shows that the retractable inserts 320 can have a central depression 323. In this regard, since the inserts perform a "lead-in" function on the entry of the non-gripped leg into the drum slot, it is convenient that, at the time of said entry, at least one pair of them protrude from the pre-inserted conductor or the slot bottom by an amount well in excess of the radial thickness of the entering leg. For the sake of simplicity of construction and operation, in an embodiment of the invention, all inserts, and not just a pair of inserts, are kept at the same radial elevation from the axis of the apparatus. In this case, the central depressions 323 of the inserts are necessary to allow the elements of the containment system to compact the legs of the basic conductors in the slots of the drum, to take the legs of the basic conductors into a position radial to the apparatus axis as close to that which the legs themselves will have in the stator when referred to the axis of the stator itself. If the legs are placed into such respective positions, the maximum level of occupation of the drum slot by the legs is less than the level of the circumference circumscribing the inserts. If there were no such central depression 323, the containment system could keep the hairpin legs only within the circumference that circumscribes the drum inserts. Furthermore, to ensure hairpins are dragged and to avoid possible jamming, it is advisable to have their legs well compacted and firm when away from the insertion area. The depression 323 defines two teeth 325 on its sides. Optionally, the two teeth 325 have a bevel 322 on both sides, the directions of the bevels forming an angle to the radial direction. The optional bevels serve the function of facilitating the sliding of the legs of the basic conductors into the slots 324. In particular, the bevel is for the leg that is not picked when it falls out of the guide 410 because the chord of the slanted hairpin is smaller than the chord between the inserts, and the dragging causes the inserted leg to knock into the insert. This applies to one of the sides of the insert. In actual fact, the bevel on the other side does not serve this purpose but is useful only in the case of rotating the drum in the opposite direction, and this is necessary in case of the reverse hairpin (see below). In this case, however, a guide, which is specular to the one shown thus far is needed. In case of I-pins, they are no longer useful because there is no second leg to insert by gravity.

The sliding guide 400 may comprise a guiding arm 410 and optionally a guide containment element 420. It can be seen how the legs of the basic conductors 200 are gradually inserted into the slots 324. As shown in the example, the basic conductors have two legs, one of which is axially inserted into a slot, and the other is contextually laid on the arm of the guide 410 under the containment element 420 (optional). Since the guiding arm is limited in the circumferential direction, after a given dragging angle the leg into the slot, the other leg on the guiding arm will also fall on a slot, as will be better seen hereafter. In other words, the sliding guide has a circumferential exit end of the basic conductors in the direction of drum rotation to drag the non-gripped legs. It is further worth noting that once the axial insertion of the basic conductors into the drum is completed, some of the gripped legs will still remain on the sliding guide. In this case, according to an embodiment of the invention, a further rotation of the drum will be needed to complete their sliding on the sliding guide until they fall into corresponding slots. This can be done at any stage of the winding set, such as after the formation of a crown or after the formation of the last crown (outermost crown). Furthermore, for the assembly of the specific winding, a repositioning of the slots around the drum rotation axis 400 is also possible at any useful time during the assembly procedure by rotating the drum in one circumferential direction or the other for any number of slot steps as required.

The guiding arm can advantageously be placed at an appropriate distance from the drum, such that the conductor inserted in the drum slot is prevented from escaping/entering. In Odawara, this is not necessary or even possible since this space is used for the radial travel of the non-gripped leg of the hairpin to the drum slot. When assembling multiple crowns, the guiding arm can be moved to make room for the radial extraction/expansion of the inserts needed to assemble the next crown.

Figure 16:
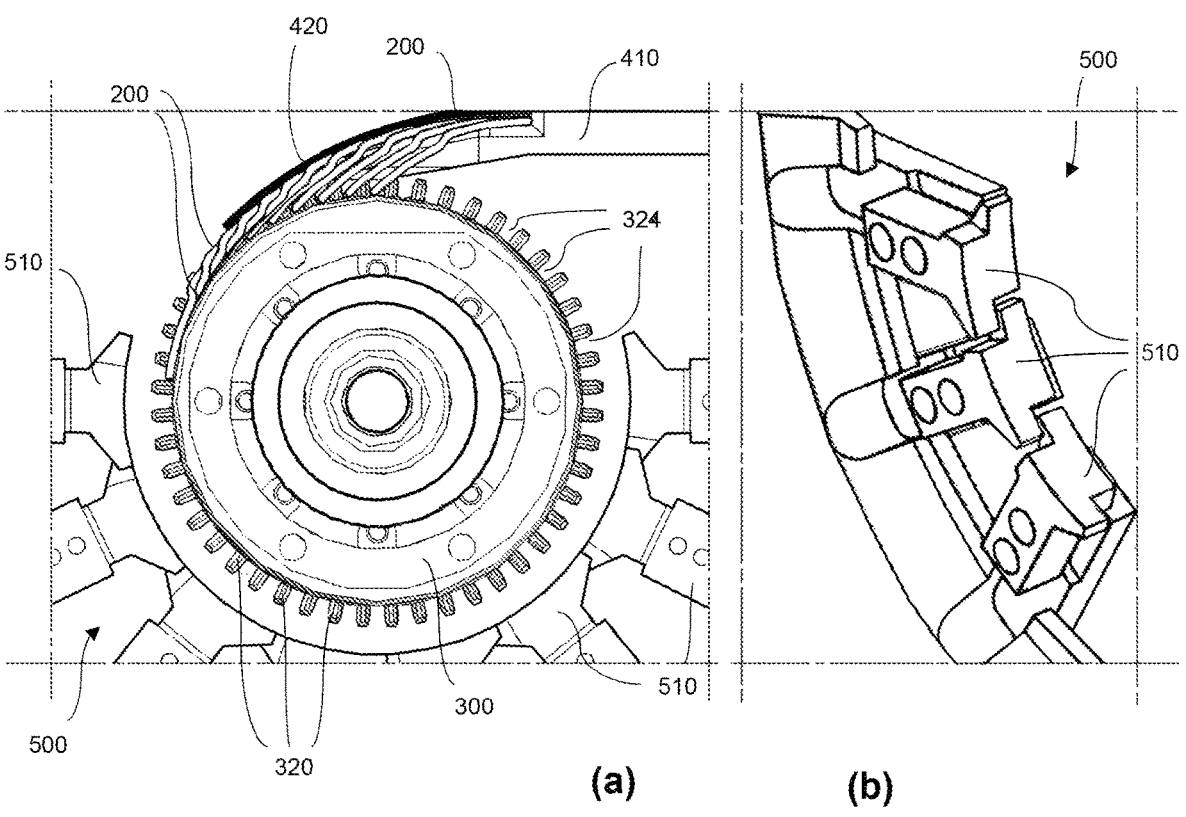
FIG. 16 shows another embodiment of the assembly section, provided with a containment system of the hairpins inserted into the slots.

According to a different embodiment of the present invention, shown in FIG. 16, the assembly frame 300 faces a containment system 500 which can be formed from an array of elements 510, which, as shown in FIG. 16 (b), can have a conformation such that a positive coupling can be achieved to compensate for a discontinuity which may be created between the elements when the inserts stretch. The Z-shape is advantageous in reducing possible "snagging" of conductors of the crown during the step of assembly with the discontinuity surfaces faced between inserts. Indeed, if the inserts did not have complementary circumferential expansions, the facing discontinuity surfaces between one insert and the other would be parallel to the axis of the apparatus and essentially parallel to the legs of the hairpins, creating a niche for them to possibly escape/snag. With circumferential expansions, the portion of the conductor in contact with the expansions of adjacent teeth can be divided into two parts. When the conductor is crossing the discontinuity between two adjacent insert expansions, a first part is continuously maintained in radial containment; when the second part crosses the first discontinuity between the expansions and thus, due to the stiffness of the conductor, avoids it snagging on the first discontinuity (circumferentially on the right in the figure) a second part is continuously maintained in radial containment; when the first part crosses the second discontinuity (circumferentially on the left in the figure) between the expansions and thus, because of the stiffness of the conductor, avoids it snagging on the second discontinuity.

Figures 17, 18:
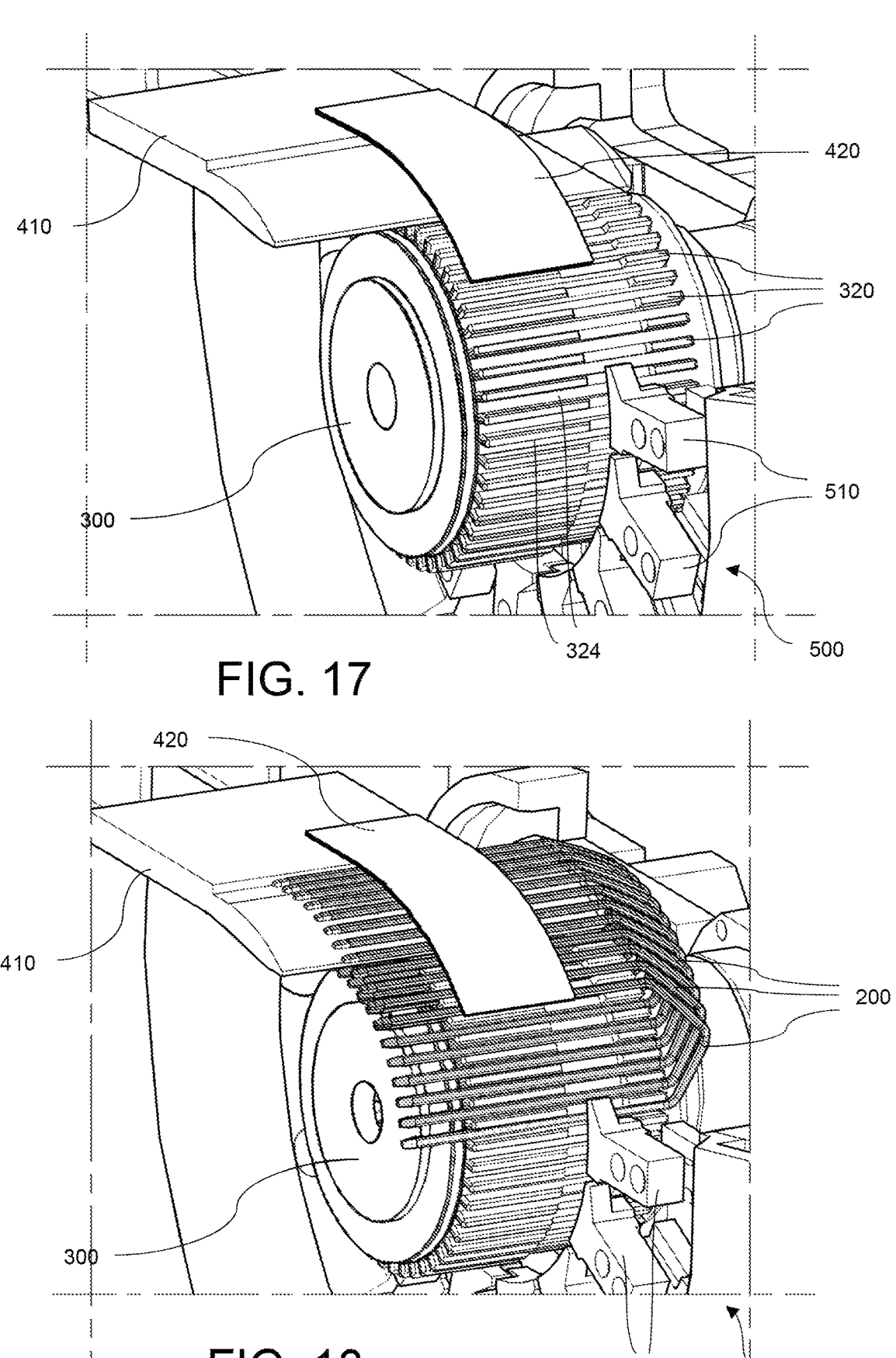
FIG. 17 shows a view of the assembly section similar to the preceding figure but in a perspective view.
FIG. 18 shows the same view as in the preceding figure, with a first set of hairpins inserted in the slots and partially on the guiding arm.

As observed in FIG. 17, the array of containment elements 500 is positioned axially so that the elements occupy the recesses of the retractable inserts, at a distance from the axis less than that of the outer circumference of the drum.

Figure 19:
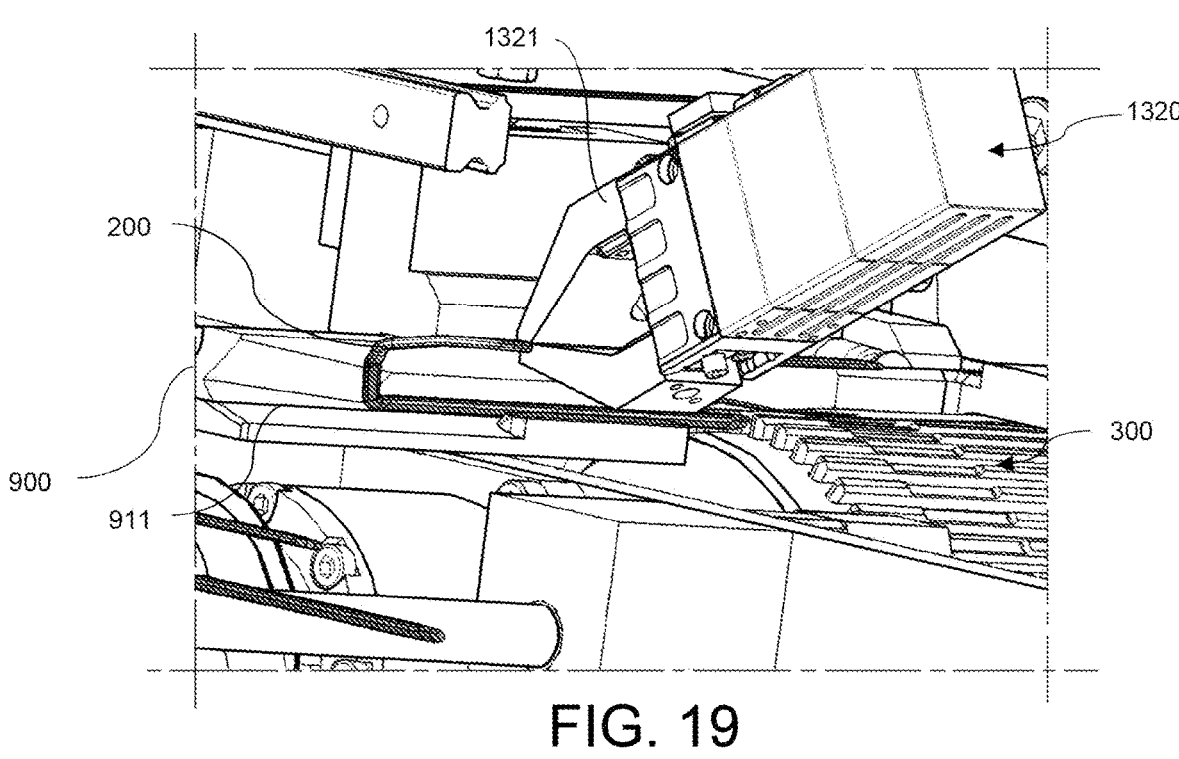
FIG. 19 shows an embodiment of the hairpin insertion on the assembly drum, in a detail perspective view.
Figure 20:
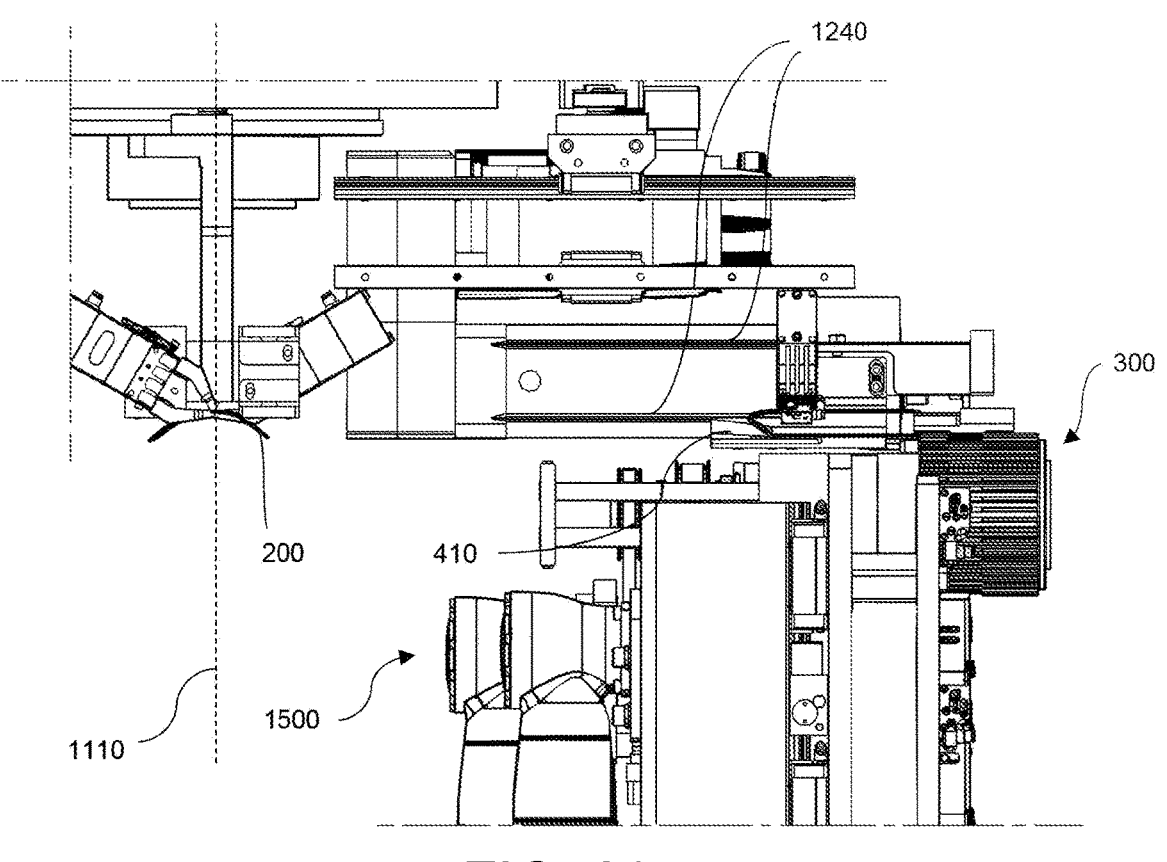
FIG. 20 shows a view similar to that in the previous figure, but on a larger scale, also including part of the hairpin transport arms.

With reference to FIG. 19, according to an embodiment, the gripper 1321 holds one of the two legs of the illustrated hairpin in place, resting the other leg on the guiding arm 410, which has an abutment 411 positioned and shaped to position the non-gripped leg at a slot 324 in the assembly frame, also referred to as assembly drum, or simply drum 300 before making a radial shift of insertion of the same non-gripped leg. FIG. 20 shows the same situation, but at a larger scale, in which the entire concerned arm 1310 is visible, along with the guides 1240 for radial sliding. Two servomotors 1500 are also visible, one rotates the assembly drum 300, and the other expands the inserts of the drum itself.

Figures 21, 22:
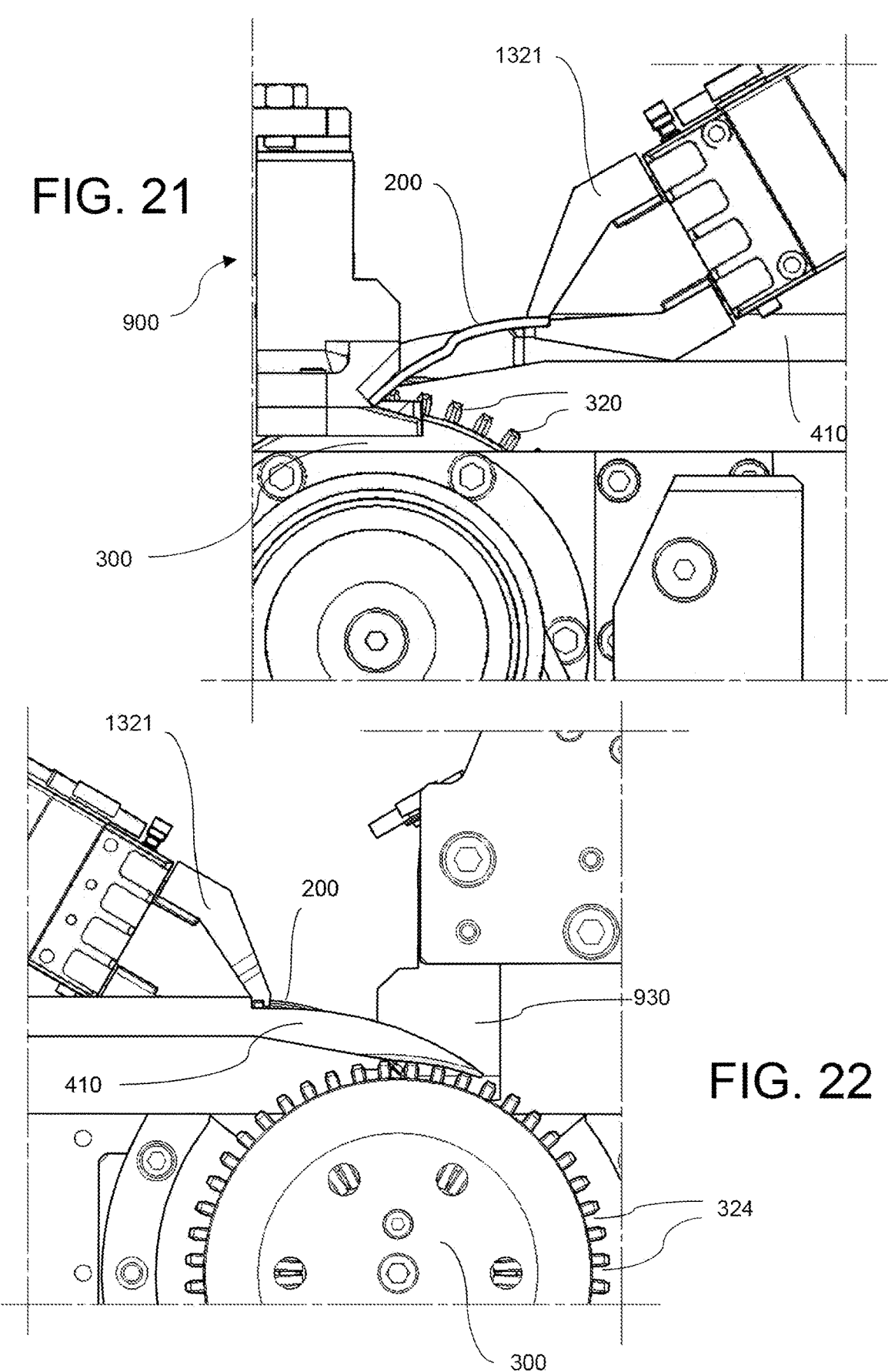
FIGS. 21 and 22 show, in two opposite side views, the positioning of a hairpin on the guiding arm in the preceding figures.

FIGS. 21 and 22 show in two opposite side views the placement of a hairpin on the guiding arm 410, as above. Reference numeral 900 indicates the lead-in guide non-gripped leg and reference numeral 930 indicates a supporting structure of the lead-in guide 900. In the case of W-pins, as more than one leg is not gripped, there may be an additional guide for the second non-gripped leg, said further guide not being shown in the figures.

FIGS. 23-25 still show the same situation as before. The hairpin is shown in the position it occupies at the end of the arm rotation. At the end of this rotation, in an embodiment of the invention, the free/hairpin end is at a radial elevation, relative to the rotation axis of the arm, greater than the minimum radial distance of the insertion guide from the same axis. The guiding device 900,910 lowers the elevation of said free end and simultaneously allows a precise axial insertion. In this regard, a first narrowing portion 911A is positioned in the abutment 911 (shown generically in FIG. 19) on the guiding arm from the side toward the gripper 1321. By virtue of this initial narrowing, with subsequent radial movement, the non-gripped leg of the hairpin can be progressively aligned with the three-sided slot 915, recovering the misalignment of the leg by springback. During the step of forming of the hairpin, a slight divergence can be purposely assigned to the hairpin legs to allow the first narrowing to work appropriately and thus make the position of the hairpin leg predeterminable. Alternatively, a minor angular offset from the radial direction can be assigned with the same gripper. If the basic conductors showed the likelihood of converging legs, a movable element would be needed to create the fourth face of the slot 915, which, together with the other three, concurs to surround in a known position the non-gripped leg. Said movable element should be removed at some point to let the hairpin bridge-like connection pass through. After the first narrowing portion 911A, in the direction towards the drum 300, there is a second portion 911B, which gradually takes the concerned leg of the hairpin closer to the third face used to guide the conductor. Finally, there is a second narrowing of the guide to enter the three-sided slot 915 along the same direction as the portion third 911C. A distance may exist between the first narrowing and the second narrowing to account for the different leg lengths of the set of hairpins processable with the device.

Although a three-sided insertion guide has been illustrated here, other types of hairpin insertion guides are also possible, e.g., to confine the non-gripped leg axially on four sides.

At this point, the insertion of the hairpin winding into a stator or rotor core is described.

Figure 26:
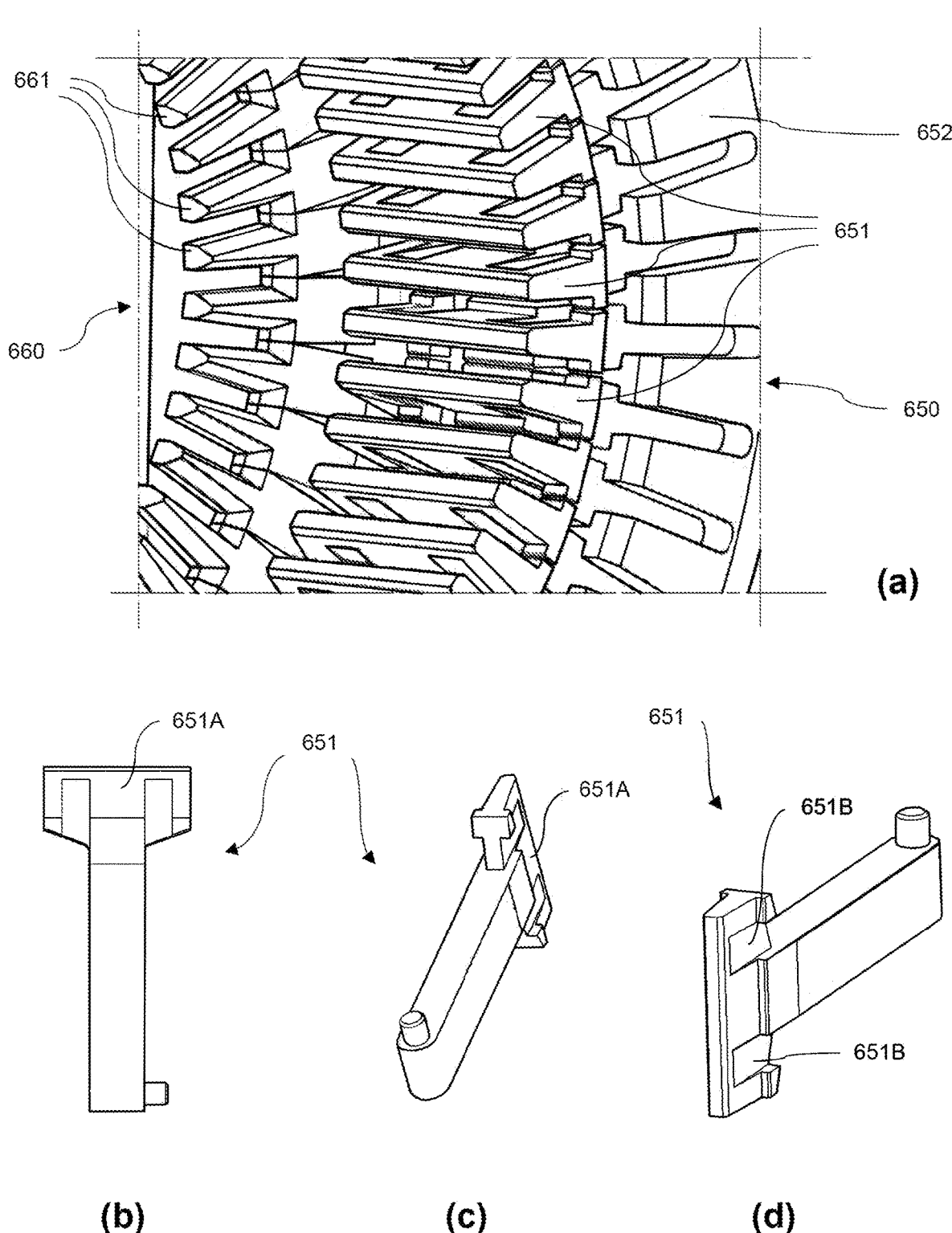
FIG. 26 shows an array of inserts for radial and circumferential positioning of the straight parts of the hairpins, positioning necessary for the insertion of the hairpin winding into the stator core.

FIG. 26 (*a*) shows an array 340 of inserts 341 for radial and circumferential positioning of the straight parts of the hairpins already inserted in the drum, in a position suited for inserting a stator pack into the slot by axial sliding on the inner surface of the drum. Two adjacent inserts 341 define, at the position of minimum distance from the axis, a perimeter within (or substantially flush with) the perimeter of the stator core slot (not shown) of the winding in question. The inserts 351 of the inner liner backing comb 350 (commonly used for electrical insulation of the various hairpin layers) are inserted with radial movement between consecutive protruding portions of the paper. The inner liner, by virtue of its flared portion which rests on the beveled part of the inserts, is prevented by said inserts from moving axially during the insertion of the conductors into the slot.

FIGS. 26(*b*)-(*d*) show from various sides the elements of the alignment arrays used to transfer the winding into the stator pack, as will be shown below. An initial array 650 comprises appropriately shaped, retractable elements 651, alternating with intermediate elements 652 which hold them in the correct radial position. Reference numeral 651A indicates the wall of the element 651 in contact with the conductors 200 which are transferred, and reference numeral 651B indicates the borings useful for retracting the insert 651 completely within the array 650. A second array 660 can be arranged further in the insertion direction into the stator pack (shown in the following figures) for a finer alignment. Preferably, the array 660 has fixed teeth 661.

Figure 27:
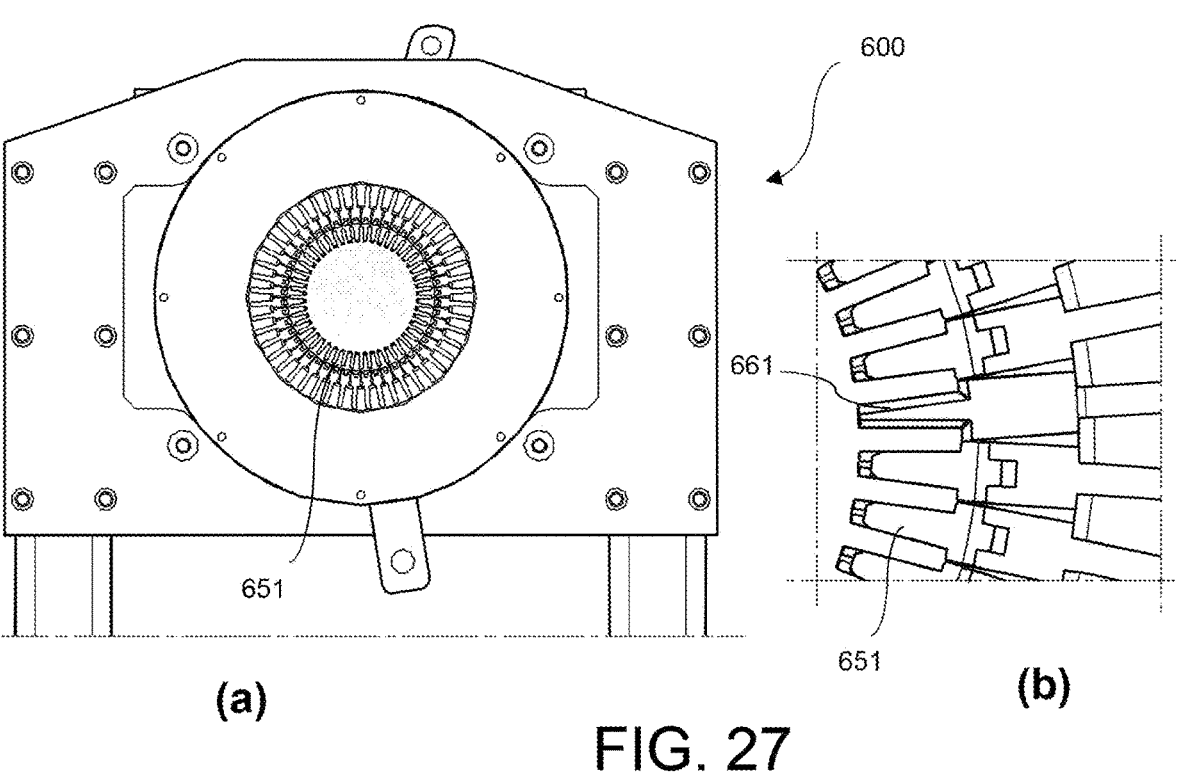
FIG. 27 (*a*) shows an insertion side view of an example of a winding insertion device obtained with the apparatus according to the invention, in a stator or rotor core; in (b) it shows a detail of the inserts of the two alignment arrays, according to an example of the invention.

FIG. 27 shows the entire block 600 comprising the two arrays 650 and 660, with tooth detail, where one of the teeth 651 is removed to show the tooth 661 of the array 660.

Figure 28:
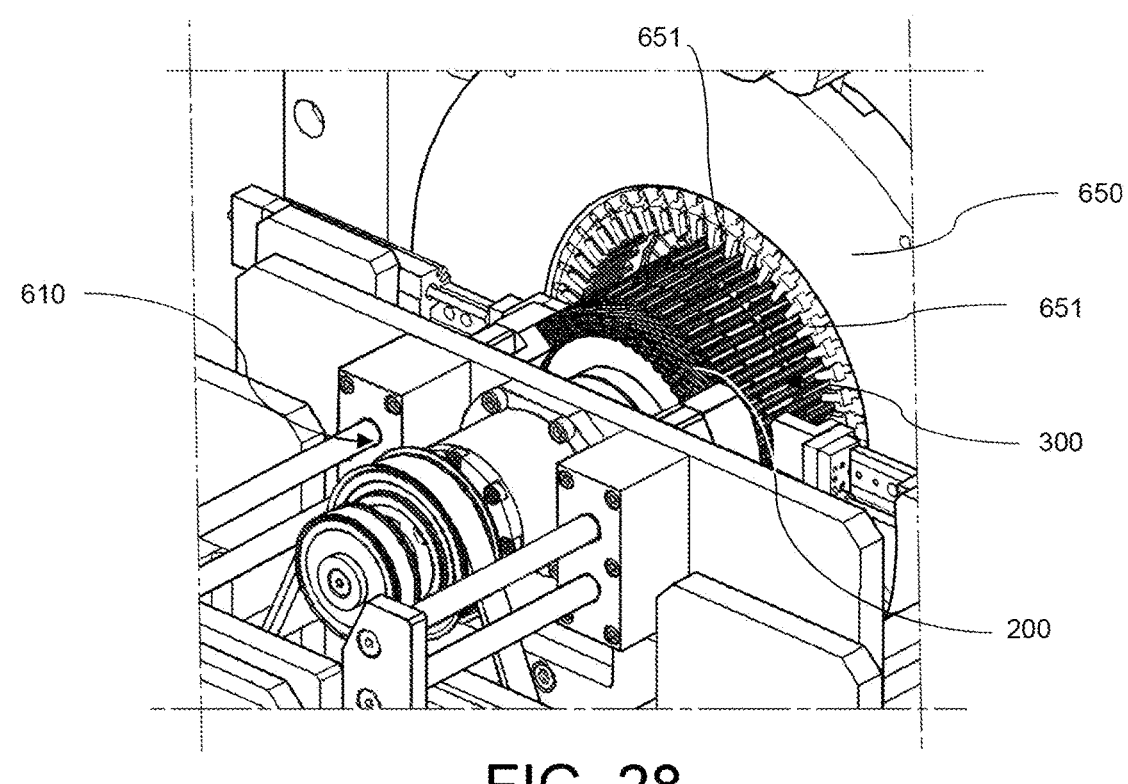
FIG. 28 shows a drum with winding crowns, inserted into the transfer system by virtue of a transfer array.

In this regard, when the assembly of the winding crowns is complete, the drum 300 keeps the straight bundles to be inserted into respective slots of the stator pack separated by means of its fully extracted inserts 320. At this point, the assembly system which includes drum 300 is approached to the insert array 650 shown in FIGS. 28-33. The positioning of the drum 300 for the successive winding transfer includes an angular positioning step so that the inserts 320 of the drum 300 are radially aligned with the inserts 651 of the transfer array 650 and an axial positioning step within the transfer system, as shown in FIG. 28. Before transferring the winding, a step that comprises a rotation of drum alignment to the stator slots according to positions assigned according to the winding type may be present.

During the transfer of the winding into the stator pack, the drum 300 keeps the straight bundles of legs separate but is not normally able to position the hairpin legs with a degree of accuracy suited for the insertion into the stator pack, especially the legs furthest from the axis of the apparatus.

Figure 29:
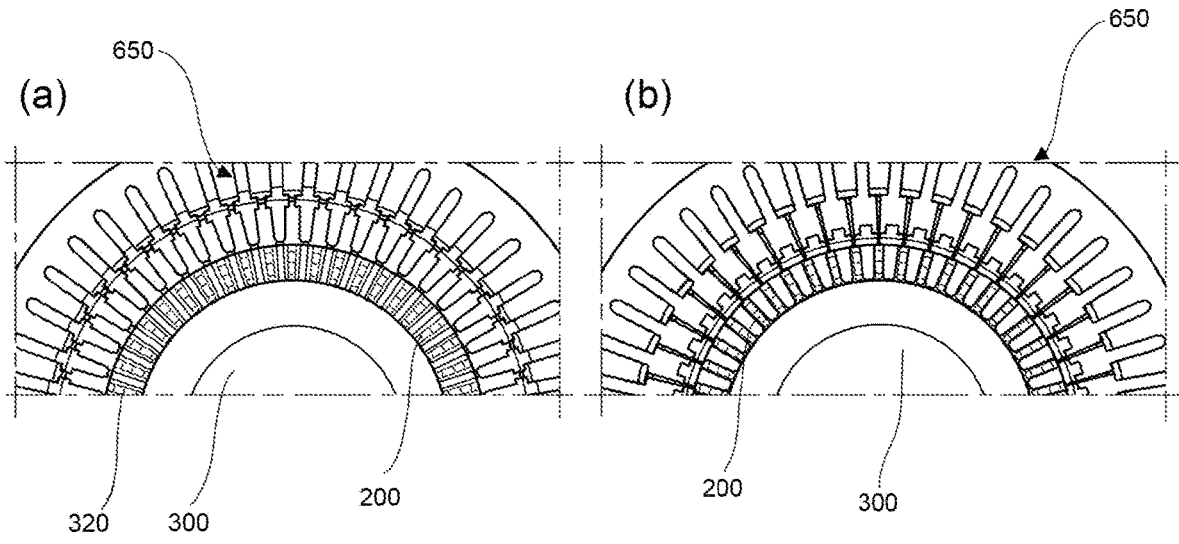
FIG. 29 shows the winding transfer array or insert array for positioning the hairpin legs in preparation for insertion into the stator pack: (a) open position for the passage of the drum; (b) closed position, which takes the hairpin legs into appropriate positions for successive axial handling and insertion into the stator pack.

Indeed, the slot for housing the conductor bundles in the drum is trapezoidal, as shown in FIG. 29. The leg bundles of the hairpins which fill a stator slot must be positioned within a rectangular perimeter included in that of the slot before the winding is inserted into the stator pack. For this purpose, the inserts 651 of the transfer array are moved radially toward the apparatus or winding axis (from the position in FIG. 29 (*a*) to the position in FIG. 29 (*b*)), preferably synchronized with the narrowing (indentation) of the inserts 320 of the drum 300, see FIG. 29. Upon completion of said extraction, the legs of the hairpins are constrained in positions suitable for the successive insertion in packs.

The positioning of the drum for the successive winding transfer includes an angular positioning step so that the inserts of the drum are radially aligned with the inserts of the transfer array and an axial positioning step within the transfer system, as shown in FIG. 28.

Figure 29B:
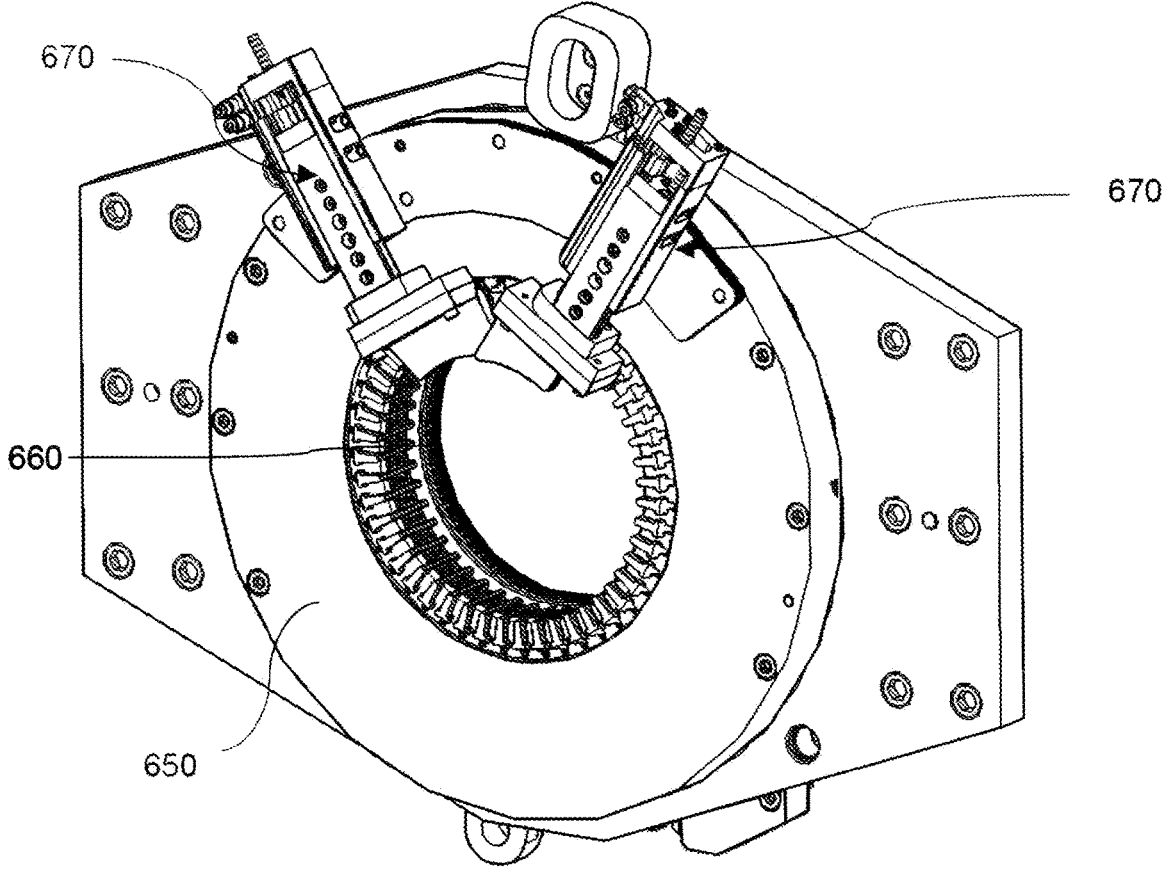
FIG. 29b shows the array of FIGS. 28 and 29, in which two additional winding containment elements are shown to complete containment around the entire circumference.

With reference to FIG. 29*b*, the array 650 in FIGS. 28 and 29 can face at least one further winding containment element 670 to complete the containment of the 500,510 elements around the entire circumference of the winding. This arrangement is advantageous to leave space for the insertion of the basic conductor into the drum without having to arrange movable containment in the upper half-circumference of the drum concerned with the insertion of the basic conductors.

Figures 30, 31:
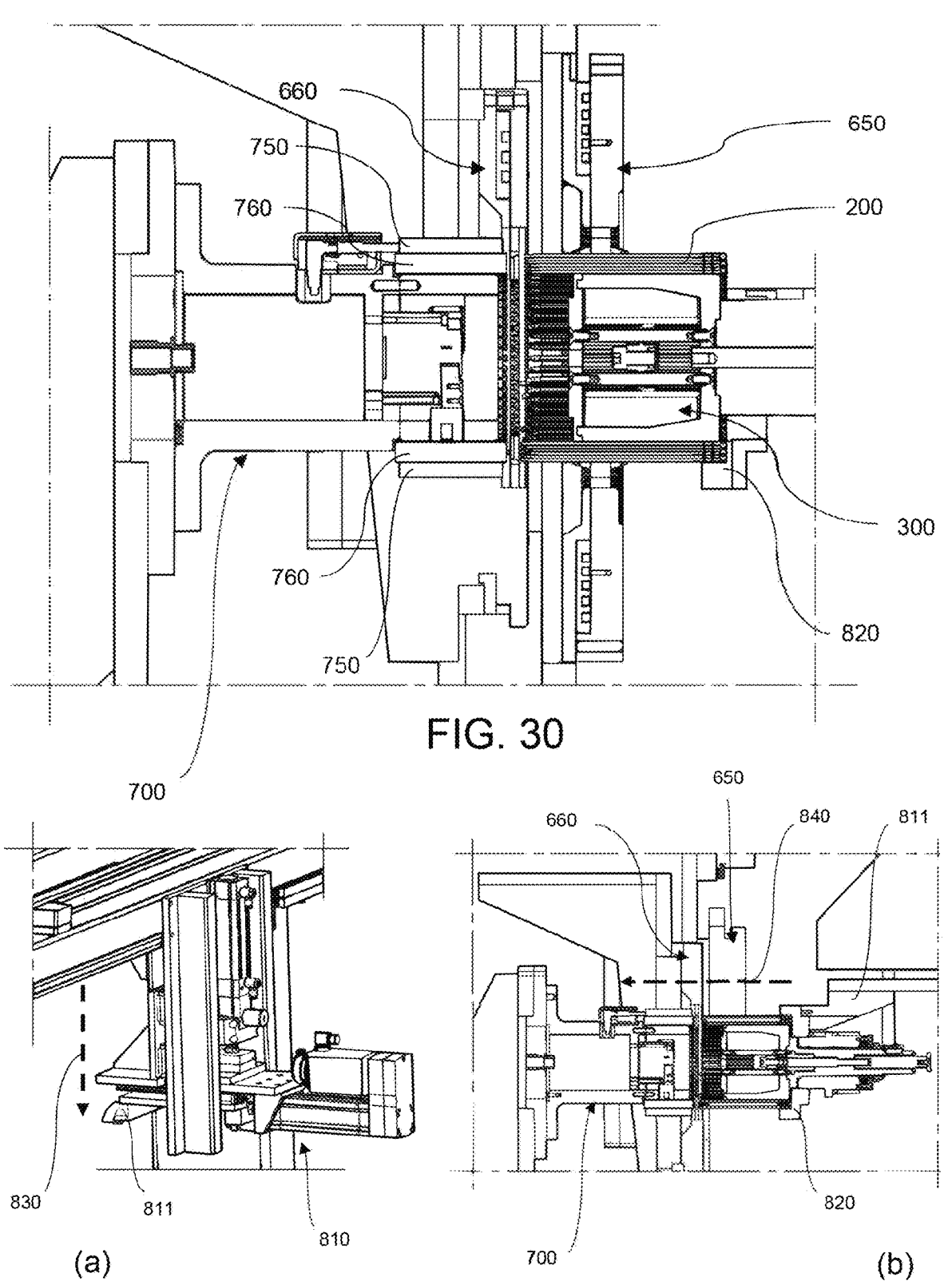
FIG. 30 shows the transfer array and the cases of the insulating inner liner, according to an embodiment of the present invention; the positioning array has fingers/teeth having bevels useful for the precise positioning of conductors for insertion into stator cavities.
FIG. 31 shows in (a) a support structure of the closing cap of the pusher, and in (b) the approach of the closing cap of the pusher.

Further refinement of the position of the bundles of conductors is achieved through the use of the positioning array ("comb array") 660 shown in FIG. 30.

At the end of the movements described above, or overlapping them, the pusher 800 consisting of two parts 810 and 820 is brought closer (in the direction of arrow 840) to the assembly drum 300 where the bridge-like connectors of the hairpin protrude, as shown in FIG. 31. The pusher is made in two parts because, at an earlier step of assembly, one of its parts 810 needs to be able to be removed to make room for the insertion of hairpins into slots of the assembly drum 300. Therefore, the part 810 also has vertical movement (direction 830 perpendicular to 840).

Figures 32, 33:
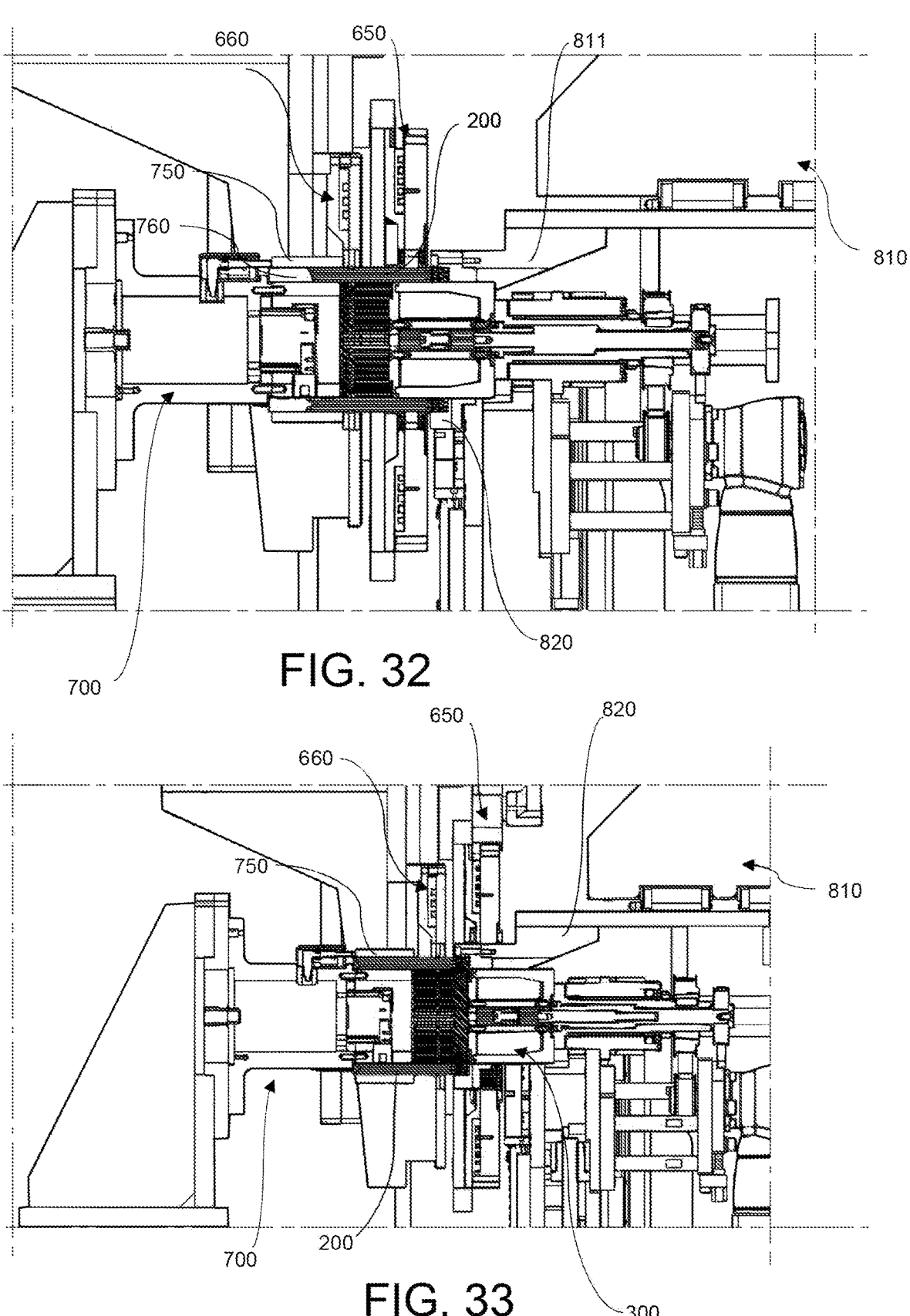
FIG. 32 shows the insertion of the winding into the stator pack.
FIG. 33 shows the completion of winding insertion into the stator pack after the transfer array expansion.

When the pusher is assembled, it can be moved to push the conductors inside the slots of the stator or rotor pack 750,760 supported by the device 700, as shown in FIG. 32. Reference numeral 750 indicates the stator yoke and reference numeral 760 is the inner liner of the stator pack. Before completion of the insertion of the conductors into the slots, the transfer array 650 is taken to the open position to allow the bridge-like connectors to slide over the surface of drum 300. By continuing the movement shown in FIG. 33, the winding insertion can be completed (in the direction from right to left).

Figure 34:
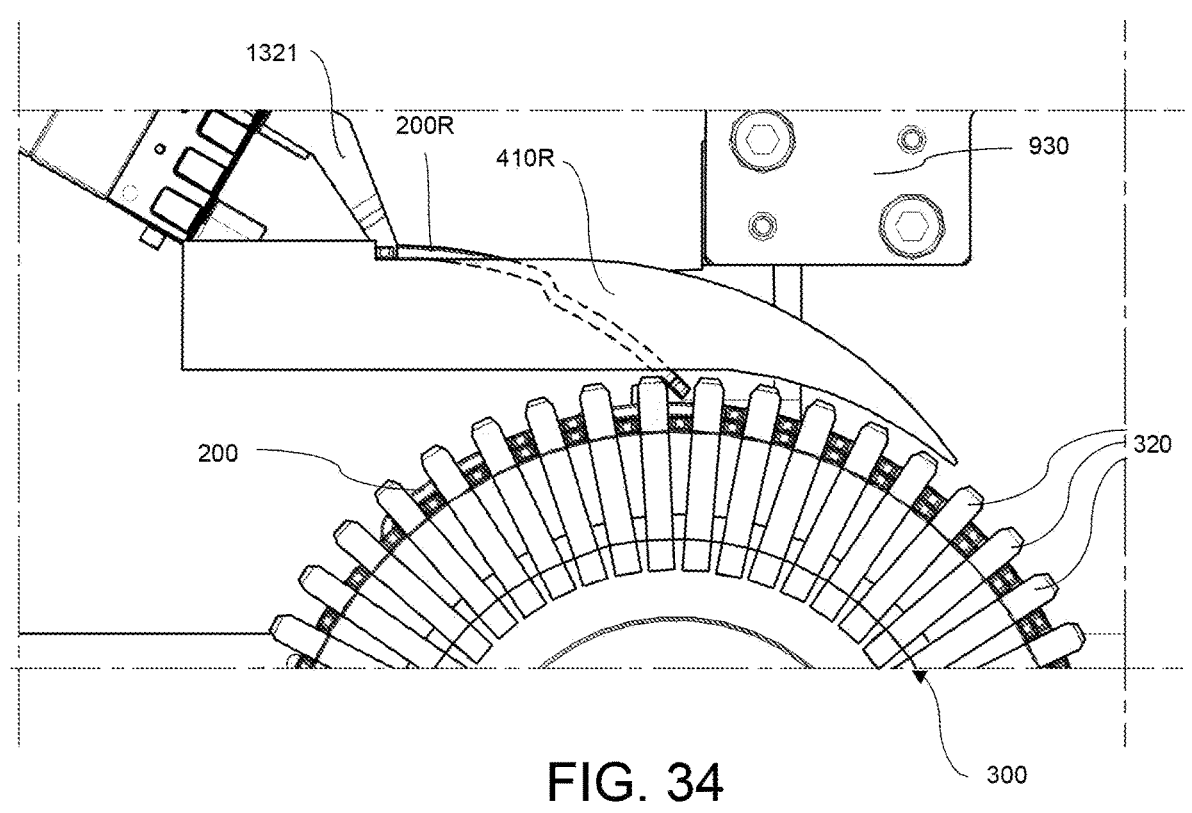
FIG. 34 shows a view of a reverse hairpin insertion with a circumferential insertion guide oriented in the opposite direction than shown in the previous figures, looking at the hairpin from the ends of its legs.
Figure 35:
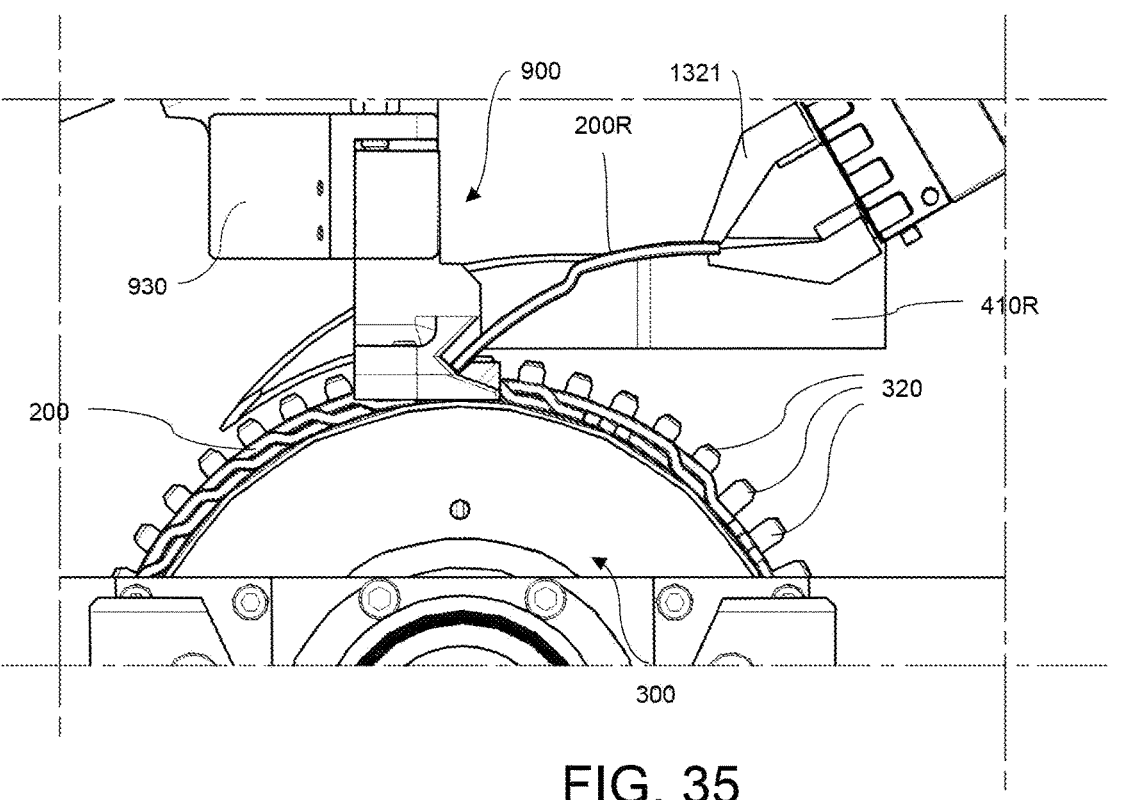
FIG. 35 shows the situation of FIG. 34, observing the hairpin from the bridge-like connection.
Figure 36:
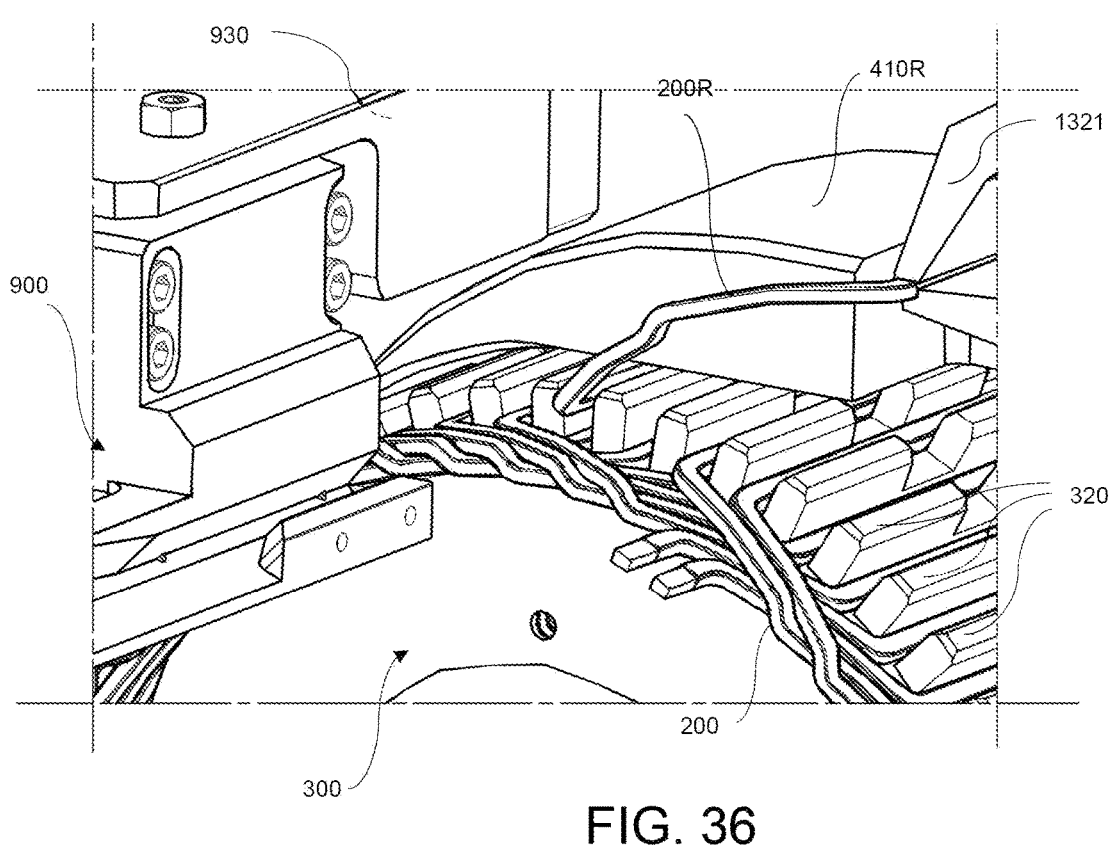
FIG. 36 shows the situation of FIGS. 34 and 35, observing the bridge-like connection with the gripper having passed the three-sided insertion guide.

Finally, more details of an embodiment in which a reverse pin is inserted into the winding are given, referring to FIGS. 34-36. It is apparent that the definition of a normal or reverse hairpin is conventional; for example, once a hairpin is taken with a right-handed bending direction in the bridge-like connection, the reverse hairpin has a left-handed bending direction and vice versa. The rotation of the drum 400 is opposite in the two cases.

As can be seen from FIG. 34, on drum 300, e.g., basic conductors have already been inserted and you now want to insert a reverse pin. For this purpose, the upper guide 410R, which has a circumferential extension direction opposite to the guide 410 (in the figures from left to right instead of right to left in views from the free leg ends), is used instead of the upper guide 410R. FIG. 35 shows the same situation but starting from the reverse pin bridge-like connection. FIG. 36 is a perspective view from the bridge-like connection side of the reverse pin.

Figure 37:
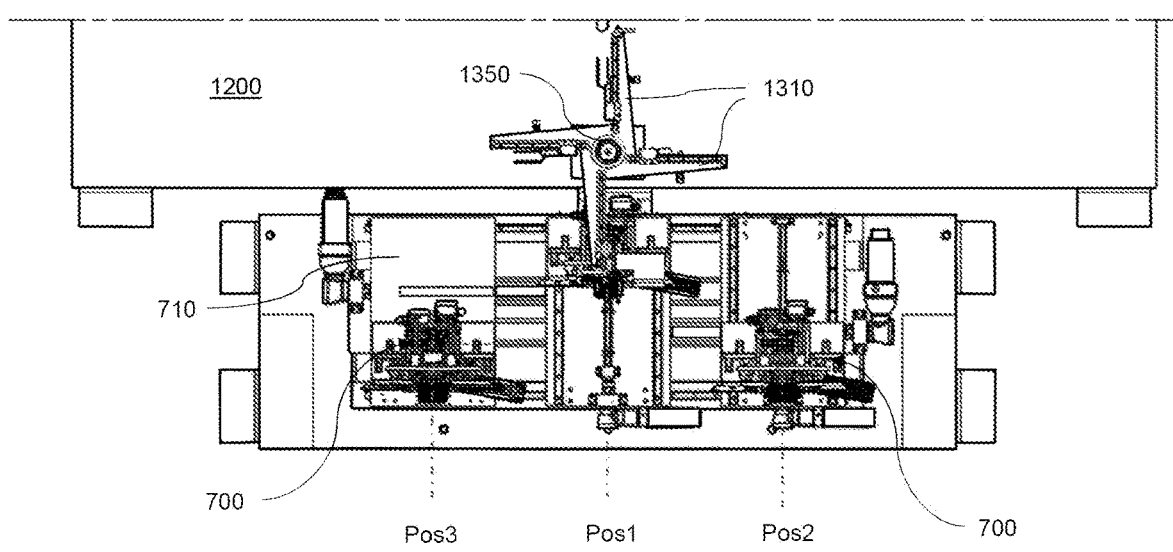
FIG. 37 shows an embodiment of the insertion section in the stator pack, in which two drum assembly systems placed on as many carriages coexist, transporting the systems from the central hairpin loading position to a side position thus increasing the production cycle.

FIG. 37 shows an embodiment of the insertion section in the stator pack, in which there are two drum assembly systems 700 placed on as many carriages 710 that transport the systems from the central hairpin loading position to a side position thus increasing the production cycle. When the winding assembly is completed, it is transferred to a position where loading into the stator pack takes place. In an embodiment, the assembly system (drum, actuators of the rotation and expansion of the inserts, radial containment system) is placed on a carriage 710 which can move perpendicular to the drum axis, from the hairpin loading position (Pos1) to one of the winding loading positions in the stator pack (Pos2/Pos3), as shown in FIG. 37. According to an advantageous aspect of the invention, two drum assembly systems coexist placed on an equal number of carriages which transport the systems from the central hairpin loading position to a side position between, Pos2 for the right drum and Pos3 for the left drum. By virtue of said coexistence, it is possible to temporally overlap the steps of transporting and inserting the winding into the stator pack with that of loading the hairpins onto the drum to increase the productivity of the plant.

Figure 38:
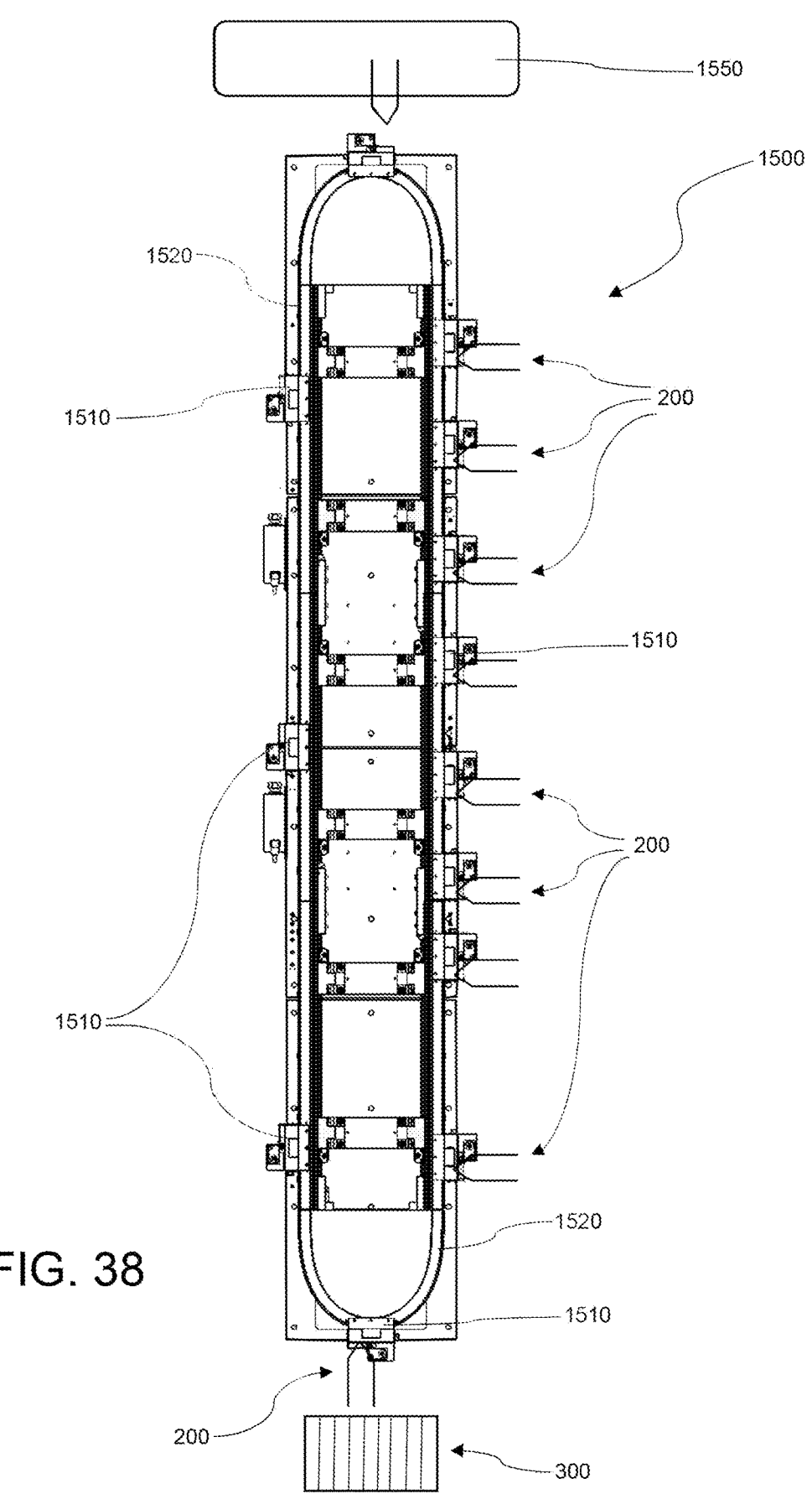
FIG. 38 shows a different embodiment of the handling of basic conductors between a feeding section and the drum, instead of the arm system.

According to FIG. 38, the arm system can be replaced by a "carousel" 1500 in which there are a plurality of handling units 1510 provided with a gripper for gripping the leg of the basic conductor 200 and configured to move from a feeding section 1550 to the drum 300 without them having to move at a predetermined mutual distance (this is true even when the handling units are themselves non-constrained arms). According to an aspect of this embodiment, the handling units 1550 can move along an oval guide 1520. The handling units are equipped with sliding guides (not shown) for inserting the basic conductor into the drum, while they may or may not be equipped with similar guides or sliding means for taking the basic conductor on the feeding section 1550. Alternatively, an element can move from the feeding section 1550 to the handling unit to carry the basic conductor. The rest of the apparatus can be as described above, with or without one or more of the optional or preferred elements.

Based on the characteristics of the apparatus described above, but also in a more general manner, the steps of an embodiment of the inventive method for handling and assembling hairpins or basic conductors are described below:

F1. when one of the N handling units 1310,1510 is in a position corresponding to one of said one or more feeding stations, actuating said gripper 1321 to grip a leg 255a, 255b of a basic conductor 200, said leg being named gripped leg;

F2. displacing said handling unit relative to the predetermined axis 1110 (or "apparatus axis") to the apparatus to take it to one or more of said assembly stations;

F3. in the position reached in step F2, displacing said gripper 1321 in a direction perpendicular relative to said predetermined axis 1110 towards said assembly drum 300, until alternately:

inserting the gripped leg into the gap of a slot 324 of the assembly drum 300, if the gripped leg is the only leg of the hairpin 200;

inserting a leg not gripped by the gripper 1321 into the gap of a slot 324 of the assembly drum 300, if the hairpin has a plurality of legs, the gripped leg remaining facing said second side of the insertion guide 400;

F4. releasing the hairpin 200 by the gripper 1321;

F5. displacing said step F1-F4 handling unit relative to the predetermined axis 1110 until positioning it at one of said one or more feeding stations;

F6. repeating the steps F1 to F5, with concomitant rotation of the drum 300 by at least one slot step in the direction towards said circumferential exit end of the sliding guide 400;

F7. finally, further rotating the drum until all of the basic conductors 200 on said basic conductor sliding guide 400 exit. According to an aspect of the invention, said handling units may be N handling arms 1310 of basic conductors 200, the N arms being rotatable relative to said predetermined axis 1110, where N=1 or N is either greater than or equal to 2, wherein for N either greater than or equal to 2 the N arms are:

angularly arranged uniformly about the predetermined axis 1110;

configured to rotate integrally on a predetermined plane about the predetermined axis 1110;

each provided with a respective gripper 1321 gripping and transporting basic conductors, the gripper 1321 along the arms by actuating the gripper sliding means.

Preferably, in step F1 said gripper 1321 is moved in a direction perpendicular to said predetermined axis 1110 towards said feeding station.

In an embodiment, if N is either greater than or equal to 2, the complete rotation of the arm in steps F1 to F6 occurs in pitches of 360°/N each, the arm taking a basic conductor in step F1 simultaneously to the insertion, into the assembly drum 300, of a basic conductor already gripped one or more pitches before by an arm different from that of steps F1-F6.

According to an aspect of the invention, the following further step is performed between step F5 and step F6:

F5b. resetting the position of the drum slots upon rotation of the drum itself in one of the circumferential directions.

According to an aspect of the invention, N=4.

According to a further aspect of the invention, in step F1, the gripped leg and a non-gripped leg of the basic conductor form an angle α such that the gripped leg, in step F3, can remain facing said second side of the insertion guide 400, without rotations of the gripper 1321.

As shown above, said set of slots 324 can advantageously be formed by alternating a corresponding set of radial drum inserts 320. Said radial inserts 320 are advantageously retractable and radially expandable, the corresponding radial retraction or expansion being adjusted during assembly of the winding set according to steps F1-F7.

To have values to prevent the basic conductors inserted in the slots 324 facing said first side of said sliding guide 400 from escaping, the distance between said sliding guide (400) and said radial inserts (320) is adjusted during the assembly of the winding set according to steps F1-F7.

In case of a basic conductor with a plurality of legs, in step F3, a guiding device for axially inserting the non-gripped leg of the hairpin 200 into a slot 324 can be conveniently interposed between the gripper 1321 and the slots 324.

According to an aspect of the invention, the radial inserts 320 axially have a depression 323 adapted to accommodate circumferential confinement elements 510 of the basic conductors 200 in the slots 324, moved by a confinement system 510.

Once the winding set is assembled on the drum 300, the following additional steps can be performed to insert the winding into a stator or rotor pack:

F8. retracting the radial inserts 320 of the drum 300;

F9. placing thrust means 810,811,820 for applying a thrust to said winding set on the drum (300) from the side of the bridge-like connections of the basic conductors 200;

F10. actuating the thrust means 810,811,820 in the direction 840 of the axis 310 of the drum towards a stator or rotor pack 750,760 to insert the free ends of the basic conductors 200 into corresponding seats of the stator or rotor pack 750,760.

For this purpose, a further step of aligning the free ends of the basic conductors with respective positions in the slots of the stator or rotor pack can be performed before step F10, the respective positions being assigned according to a predetermined winding pattern, the alignment being carried out by one or more alignment arrays for the alignment of the free ends of the basic conductors 200.

In this case, one or more alignment arrays of the free ends of the basic conductors 200 may comprise an array with movable radial elements, which can be moved towards the axis of the drum 300.

If the basic connectors of the winding set comprise hairpins of different bridge-like connection bending directions (reverse hairpin, see above), a sliding guide 400 having an opposite circumferential exit end is used in step F3 on a case-by-case basis.

Before step F3, the mutual distance between drum axis 320 and gripper 1321 can conveniently be adjusted.

To increase the productivity of the apparatus according to the invention, two handling units of as many assembly drums 300 are provided, and wherein the following steps are performed:

F11. actuating a first unit of the two handling units to move it from the in-axis position of step F3 to an offset position;

F12. actuating the second unit of the two handling units to take it from an offset position to the in-axis position of step F3;

F13. carrying out steps F8-F10 with the first handling unit;

F14. executing steps F1-F7 with the second handling unit; and

F15. repeating the cycle of steps F11-F14 wherein the first handling unit is identified as the one exiting step F14 and the second handling unit is identified as the one exiting step F13.

In the apparatus and method according to the invention, the situation appears different both morphologically and functionally compared to the prior art described in the Odawara patent applications US2019/0190359 and US 2019/0356188. Indeed, the pulley wheel 1320 is smaller than the assembly drum 300 (see FIG. 13), and there is a dedicated opening for approaching the latter. The contrast observed in Odawara is missing, in which, even if one were to make an axial shift of the hairpin (which is not suggested anyway), in addition to having to change the respective mechanisms, there would be no space for such a movement, because the cylinder dragging gear has a larger diameter than the latter, and this diameter is functional for the operation of other parts of the apparatus.

The system according to the invention solves, inter alia, the problem of translating and rotating the basic conductor by 180°. The starting point is that the basic conductor is supplied from the previous station with the cusp (read bridge-like connection) facing the assembly system, i.e., with the legs farther away from it than the cusp. To work, the assembly system requires the hairpin to be rotated 180° before being inserted.

In general, the invention can use any basic conductor 200,200R of those described in the prior art section, including I-pins, W-pins, and inverse pins.

Two or more of the parts (elements, devices, systems) described above can be freely associated and considered as part kits according to the invention.

Advantages of the Invention

The advantages of the invention include:

1. Axial insertion of the hairpin leg between two consecutive retractable drum inserts, resulting in greater control of the hairpin position, useful for greater control of the movement of the conductor array in the loading zone on the drum. Said movement is delicate because of the risk of blockage due to interference between the bridge-like connection portions of the hairpins. Greater control avoids this risk;

2. The distance between the guiding arm and the inserts may not exceed the thickness of the conductor forming the hairpin. In Odawara, this is not possible because the radial direction is used to insert it (axially in Odawara there is the pusher, at most, you can close the guide after the hairpin has passed radially, which is not indicated anyway). Even if the hairpin could pass radially and then remain confined by radial displacement to a position where the guiding arm has no openings, in actual fact before the rotational displacement it could partially exit back through the same entry opening and thus become jammed with the rest of the arm. The guide in the present invention acts as both a guide and a containment, even the second leg does not fall by gravity but is accompanied. This is especially important because the basic conductor is never perfect, and with accompaniment, small variations in form can be recovered.

3. Axial insertion, in association with the need to properly confine the hairpin leg sandwiched between two contiguous retractable drum inserts, allows for shorter crown assembly times than in the prior art. Indeed, in the prior art, the hairpin is inserted with approach movement to the drum with radial and circumferential components (TBV). The co-presence of these two movements makes it more complex to devise a first-leg hairpin confinement system, which can keep up with a high hairpin forming cadence (1.5 s). In other words, the addition of a confinement device of the first leg of the hairpin, in a device according to the prior art, would achieve advantage 1, but at the cost of additional complexity required to free up space for the insertion of the next hairpin. To avoid this additional action, it is advantageous to place the hairpin on the drum with axial movement, and to this end, with an apparatus that allows said movement to be exploited adequately and consistently;

4. In the system according to the present description, the guiding arm can be placed at an appropriate distance from the drum, such that the conductor inserted into the drum slot is prevented from escaping/entering. In case of Odawara, on the other hand, the space between the guiding arm and the drum inserts is used to insert the non-gripped leg of the hairpin into the drum slot. Advantageously, the guide is radially movable to change the distance from the drum.

Hereto, we have described the preferred embodiments and suggested some variants of the present invention, but it is understood that a person skilled in the art can make modifications and changes without departing from the respective scope of protection, as defined by the appended claims.

The invention claimed is:

1. A method of assembling basic conductors in a winding set for an electric machine stator or rotor, comprising use of:

one or more basic conductor feeding stations, each basic conductor comprising one or more legs and a bridge connection having a bending direction and connecting the one or more legs;

N handling units for handling the basic conductors, each handling unit being provided with a respective gripper for gripping and transporting the basic conductors along a respective path about a predetermined axis, wherein said handling units have N handling arms to hold the basic conductors, the N handling arms being rotatable with respect to said predetermined axis, wherein N=1 or N is either greater than or equal to 2, wherein for N being either greater than or equal to 2 the N handling arms are:

angularly arranged uniformly about the predetermined axis;

configured to rotate integrally on a predetermined plane about the predetermined axis;

the gripper sliding along the handling arms by actuating gripper sliding means;

one or more basic conductor assembly stations for one or more winding sets, comprising:

an assembly drum rotatable about a drum axis arranged perpendicular to said predetermined axis and comprising a series of slots arranged circumferentially on an outer cylindrical surface of the assembly drum at a sequential spacing of one slot pitch, each slot having a gap extending in radial direction and along the drum axis, the gap being open in an outward radial direction from the assembly drum and passing through parallelly to the drum axis;

a basic conductor sliding guide with a first side facing a circumference arc of said assembly drum and a second side opposite to said first side, and with a circumferential exit end wherefrom the basic conductors exit, upon rotation of said assembly drum, at one end of said circumference arc;

the method comprising the following steps:

F1. when one of the N handling units is in a position corresponding to one of said one or more basic conductor feeding stations, actuating said gripper to grip a leg of a basic conductor;

F2. displacing said handling unit with respect to the predetermined axis to move the basic conductors to said one or more basic conductor assembly stations;

F3. in the position reached in step F2, displacing said gripper in a direction perpendicular to said predetermined axis towards said assembly drum, until alternately:

inserting, by said gripper, the leg gripped by said gripper into the gap of a slot parallel to the drum axis, or inserting, by said gripper, a leg not gripped by the gripper into the gap of a slot parallel to the drum axis wherein the leg gripped by said gripper remains facing said second side of the basic conductor sliding guide;

F4. after step F3, releasing the basic conductor by the gripper;

F5. displacing said handling unit of steps F1 to F4 with respect to the predetermined axis until positioning the handling unit at one of said one or more basic conductor feeding stations;

F6. repeating steps F1 to F5, with concurrent rotation of the assembly drum by at least one slot pitch in a direction towards said circumferential exit end of the basic conductor sliding guide; and F7. further rotating the assembly drum until all of the basic conductors on said basic conductor sliding guide exit.

2. The method of claim 1, wherein in step F1 said gripper is moved in a direction perpendicular to said predetermined axis towards said one feeding station.

3. The method of claim 1, wherein, if N is either greater than or equal to 2, a complete rotation of the handling arm in steps F1 to F6 occurs in pitches of 360°/N each, the handling arm taking a basic conductor in step F1 simultaneously to an insertion, into the assembly drum, of a basic conductor already gripped one or more pitches before by a handling arm different from that of steps F1 to F6.

4. The method of claim 1, wherein the following further step is performed between step F5 and step F6:

F5b. resetting the position of the slots upon rotation of the assembly drum in a circumferential direction.

5. The method of claim 1, wherein N=4.

6. The method of claim 1, wherein in step F1, the gripped leg and a non-gripped leg of the basic conductor form an angle α such that the gripped leg, in step F3, remains facing said second side of the basic conductor sliding guide, without rotations of the gripper.

7. The method of claim 1, wherein said series of slots comprises a corresponding series of radial inserts of the assembly drum.

8. The method of claim 7, wherein said radial inserts are radially retractable and expandable, radial retraction or expansion being adjusted when assembling the winding set according to steps F1 to F7.

9. The method of claim 8, wherein a distance between said basic conductor sliding guide and said radial inserts is adjusted when assembling the winding set according to steps F1 to F7 so that the basic conductors inserted into the slots facing said first side of said basic conductor sliding guide are prevented from escaping.

10. The method of claim 1, wherein in step F3, in the case of a basic conductor with a plurality of legs, a guiding device for axially inserting a non-gripped leg of the basic conductor into a slot is interposed between the gripper and the slots.

11. The method of claim 7, wherein said radial inserts axially have a depression adapted to accommodate circumferential confinement elements of the basic conductors in the slots moved by a confinement system.

12. The method of claim 8, wherein, once the winding set has been assembled on the assembly drum, the following further steps are performed:

F8. retracting the radial inserts of the assembly drum;

F9. placing thrust means for applying a thrust to said winding set on the assembly drum from a side of the bridge connection of the basic conductors; and F10. actuating the thrust means in a direction of the drum axis towards a stator or rotor pack so as to insert free ends of the basic conductors into corresponding seats of the stator or rotor pack.

13. The method of claim 12, the method further comprising aligning the free ends of the basic conductors with respective positions in the slots of the stator or rotor pack before step F10, the respective positions being assigned according to a predetermined winding pattern, the alignment being carried out by one or more alignment arrays of the free ends of the basic conductors.

14. The method of claim 13, wherein said one or more alignment arrays of the free ends of the basic conductors comprise an array with movable radial elements, movable towards the drum axis.

15. The method of claim 1, wherein, if the basic conductors of the winding set comprise basic conductors with a different bending direction of the bridge connection, the basic conductor sliding guide used in step F3 has a circumferential exit at an opposite end of said circumference arc, accordingly.

16. The method of claim 1, wherein mutual distance between the drum axis and the gripper is adjusted before step F3.

17. The method of claim 12, wherein two handling units of as many basic conductor assembly stations are provided, and wherein the following steps are performed:

F11. actuating a first handling unit of the two handling units to move the first handling unit from an in-axis position of step F3 to an offset position;

F12. actuating the second handling unit of the two handling units to take the second handling unit from an offset position to the in-axis position of step F3;

F13. carrying out steps F8 to F10 with the first handling unit;

F14. carrying out steps F1 to F7 with the second handling unit; and

F15. repeating steps F11 to F14, wherein the first handling unit is identified as the one exiting step F14 and the second handling unit is identified as the one exiting step F13.

18. An apparatus for assembling basic conductors in a winding set for an electric machine stator or rotor, comprising:

one or more basic conductor feeding stations, each basic conductor comprising one or more legs and a bridge connection having a bending direction and connecting the one or more legs;

N handling units, each handling unit being provided with a respective gripper for gripping and transporting the basic conductors along a respective path about a predetermined axis, wherein said handling units have N handling arms to hold the basic conductors, the N handling arms being rotatable with respect to said predetermined axis, wherein N=1 or N is either greater than or equal to 2, wherein for N being either greater than or equal to 2 the N handling arms are:

angularly arranged uniformly about the predetermined axis;

configured to rotate integrally on a predetermined plane about the predetermined axis;

the gripper sliding along the handling arms by actuating gripper sliding means;

one or more basic conductor assembly stations for one or more winding sets, comprising:

an assembly drum rotatable about a drum axis arranged perpendicular to said predetermined axis and comprising a series of slots arranged circumferentially on an outer cylindrical surface of the assembly drum at a sequential spacing of one slot pitch, each slot having a gap extending in radial direction and along the drum axis, the gap being open in an outward radial direction from the assembly drum and passing parallel to the drum axis;

a basic conductor sliding guide with a first side facing a circumference arc of said assembly drum and a second side opposite to said first side, and with a circumferential exit end wherefrom the basic conductors exit, upon rotation of said assembly drum, at one end of said circumference arc;

wherein said respective gripper is configured to alternately:

insert a gripped leg into the gap of a slot parallel to the drum axis, if the gripped leg is the only leg of the basic conductor;

insert a leg not gripped by the gripper into the gap of a slot parallel to the drum axis, if the basic conductor has a plurality of legs, the gripped leg remaining facing said second side of the basic conductor sliding guide;

and to release the basic conductor and retract perpendicularly to said predetermined axis once the gripped leg has been inserted into the assembly drum.

19. The apparatus of claim 18, wherein N=4.

20. The apparatus of claim 18, wherein said series of slots is formed by alternating a corresponding series of radial inserts of the assembly drum.

21. The apparatus of claim 20, wherein said radial inserts are radially retractable and expandable.

22. The apparatus of claim 18, wherein in the case of a basic conductor with a plurality of legs, a guiding device for axially inserting a non-gripped leg of the basic conductor into a slot is provided between the gripper and the slots.

23. The apparatus of claim 20, wherein circumferential confinement elements of the basic conductors are provided in the slots, moved by a confinement system, said radial inserts axially having a depression adapted to accommodate said circumferential confinement elements.

24. The apparatus of claim 18, wherein thrust means for pushing said winding set into the assembly drum are provided, the thrust means being configured:

to be placed on a side of the bridge connection of the basic conductors;

to be actuated in a direction of the drum axis toward a stator or rotor pack so as to insert free ends of the basic conductors into corresponding seats of the stator or rotor pack.

25. The apparatus of claim 24, wherein one or more alignment arrays of the free ends of the basic conductors are provided, which are configured to align the free ends of the basic conductors with respective positions in the seats of the stator or rotor pack assigned according to a predetermined winding pattern.

26. The apparatus of claim 25, wherein said one or more alignment arrays of the free ends of the basic conductors comprise an array with movable radial elements, movable towards the drum axis.

27. The apparatus of claim 18, wherein, if the basic conductors of the winding set comprise basic conductors with a different bending direction of the bridge connection, a basic conductor sliding guide having an opposite circumferential exit end is further provided.

* * * * *